US010891021B2

(12) United States Patent
Nishiyama et al.

(10) Patent No.: US 10,891,021 B2
(45) Date of Patent: Jan. 12, 2021

(54) DYNAMIC VARIATION FOR SELECTION OPTION INFORMATION PRESENTATION

(71) Applicant: FUJITSU LIMITED, Kawasaki (JP)

(72) Inventors: Soichi Nishiyama, Ota (JP); Hiroaki Sugimura, Ota (JP)

(73) Assignee: FUJITSU LIMITED, Kawasaki (JP)

(*) Notice: Subject to any disclaimer, the term of this patent is extended or adjusted under 35 U.S.C. 154(b) by 131 days.

(21) Appl. No.: 15/271,286

(22) Filed: Sep. 21, 2016

(65) Prior Publication Data
US 2017/0115835 A1   Apr. 27, 2017

(30) Foreign Application Priority Data

Oct. 23, 2015   (JP) .................................. 2015-209204

(51) Int. Cl.
*G06F 3/0481*     (2013.01)
*G06F 3/0482*     (2013.01)
(Continued)

(52) U.S. Cl.
CPC .......... *G06F 3/0482* (2013.01); *G06F 3/0483* (2013.01); *G06F 3/0488* (2013.01);
(Continued)

(58) Field of Classification Search
CPC .. G06F 3/04817; G06F 3/0482; G06F 3/1423; G06F 3/1647
See application file for complete search history.

(56) References Cited

U.S. PATENT DOCUMENTS 5,754,179 A * 5/1998 Hocker ................. G06F 3/0481
715/835
9,240,826 B2 * 1/2016 Shin ...................... G06F 3/1454
(Continued)

FOREIGN PATENT DOCUMENTS

JP  2001-060194 A   3/2001
JP  2002-108946 A   4/2002

OTHER PUBLICATIONS

Extended European Search Report dated Mar. 13, 2017 for corresponding European Patent Application No. 16190091.5, 8 pages.
(Continued)

*Primary Examiner* — Alvin H Tan
(74) *Attorney, Agent, or Firm* — Fujitsu Patent Center

(57) ABSTRACT

A selection option information presentation system includes a processor that executes a procedure. The procedure includes: displaying plural items of selection option information on a first display device in states in which a selection operation can be received, and, at a specific timing in a duration in which no selection operation is detected, modifying and displaying a display position of at least one or more items of selection option information set as a display target such that a combination of adjacent items of selection option information within a display region forms a combination in which a display position differs in an up-down direction or a left-right direction, or both; and, when a selection operation of any of the plural items of selection option information displayed on the first display device has been received, displaying the selection option information that received the selection operation on a second display device.

18 Claims, 23 Drawing Sheets

(51) Int. Cl.
*G06F 9/451* (2018.01)
*G06F 3/0483* (2013.01)
*G06F 3/0488* (2013.01)

(52) U.S. Cl.
CPC ...... *G06F 3/04817* (2013.01); *G06F 3/04886* (2013.01); *G06F 9/451* (2018.02)

(56) References Cited

U.S. PATENT DOCUMENTS

| | | | |
|---|---|---|---|
| 2002/0077882 | A1 | 6/2002 | Nishikawa et al. |
| 2005/0204313 | A1* | 9/2005 | Enoki ...................... G09G 3/28 715/867 |
| 2011/0084925 | A1 | 4/2011 | Baik et al. |
| 2013/0127734 | A1 | 5/2013 | Dowd et al. |
| 2015/0112984 | A1 | 4/2015 | Yutaka et al. |

OTHER PUBLICATIONS

European Office Action dated Nov. 27, 2018 for corresponding European Patent Application No. 16190091.5, 7 pages. *Please note US-2011/084925-A1, US-2013/127734-A1 and US-2015/112984-A1 cited herewith, were previously cited in an IDS filed on Jun. 6, 2017.*.
European Office Action dated May 24, 2019 for corresponding European Patent Application No. 16190091.5, 9 pages. *Please note D1-D3 cited herewith was previously cited in an IDS filed on Jun. 6, 2017.*.
Chinese Office Action dated Oct. 28, 2019 for corresponding Chinese Patent Application No. 201610865467.1, with English Translation, 20 pages. *Please note US-2011084925-A1, US-2013127734-A1 and US-2015112984-A1 cited herewith, were previosuly cited in an IDS filed on Jun. 6, 2017.*.

* cited by examiner

| CARD ID | KEYWORD | IMAGE DATA | ... |
|---|---|---|---|
| C0001 | GOING MOBILE | c0001.jpg | |
| C0002 | GLOBAL EXPANSION | c0002.jpg | |
| ... | | | |

| CARD ID | DISPLAY POSITION | ... |
|---|---|---|
| C0001 | (x1,y1) | |
| C0002 | (x2,y2) | |
| ... | | |

FIG.9

| BACKGROUND ID | IMAGE DATA | ... |
|---|---|---|
| B0001 | b0001.jpg | |
| B0002 | b0002.jpg | |
| ... | | |

| VISION ID | USER ID | BACKGROUND ID | CARD ID | DISPLAY POSITION | TITLE | HANDWRITTEN DATA | ... |
|---|---|---|---|---|---|---|---|
| V0001 | U0001 | B0001 | C0001 | (x1,y1) | FUTURE OF WORKING STYLES | v0001.jpg | |
| | | | C0002 | (x2,y2) | | | |
| | | | ... | | | | |
| ... | | | | | | | |

| CARD ID | INITIAL DISPLAY POSITION | MOVEMENT INFORMATION | ... |
|---|---|---|---|
| C0001 | (x1,y1) | 1 PIXEL IN +x DIRECTION PER CYCLE | |
| C0001 | (x2,y2) | 1 PIXEL IN −x DIRECTION PER CYCLE | |
| ... | | | |

| CARD ID | TITLE | IMAGE DATA | CATEGORY | | ... | |
|---|---|---|---|---|---|---|
| | | | CATEGORY A | CATEGORY B | ... | |
| C0001 | GOING MOBILE | c0001.jpg | ATTRIBUTE a | ATTRIBUTE a | | |
| C0002 | GLOBAL EXPANSION | c0002.jpg | ATTRIBUTE b | ATTRIBUTE a | | |
| ... | | | | | | |

316

DYNAMIC VARIATION FOR SELECTION OPTION INFORMATION PRESENTATION

CROSS-REFERENCE TO RELATED APPLICATION

This application is based upon and claims the benefit of priority of the prior Japanese Patent Application No. 2015-209204, filed on Oct. 23, 2015, the entire contents of which are incorporated herein by reference.

FIELD

The embodiments discussed herein are related to a selection option information presentation system, a selection option information presentation method, and a storage medium storing a selection option information presentation program.

BACKGROUND

In planning and development of products and services, the rapidity and accuracy with which user desires are extracted from unprocessed comments made by users is important. Under such circumstances, nowadays, various investigations into user desires, such as surveys and interviews, are performed proactively to extract user desires with regards to products and services, and to swiftly place a product or service that satisfies users on the market. Technology has therefore been proposed for assisting extraction of user desires.

For example, technology has been proposed that analyzes inputted desire information, and, based on the analyzed desire information, weights an evaluation index that is a scale for quantitatively measuring the degree to which potential profits might be realized with regards to products, pre-stored in a storage device, targeting users encompassed by the desire information. In this technology, one or plural evaluation indices having the highest weight are selected from the plural weighted evaluation indices, and one or plural product design concepts are chosen to maximize or minimize the selected evaluation indices.

Technology has also been proposed in which scene information, this being documents and appended information related to products or services that the documents pertain to, is input, and analysis is performed based on morphological analysis of the inputted documents. In such technology, documents are converted into demand expressions indicating product or service states that users demand of products or services, according to specific conversion rules based on the scene information, and the documents and the demand expressions are associated with each other and displayed.

RELATED DOCUMENTS

Japanese Laid-Open Patent Publication No. 2002-108946
Japanese Laid-Open Patent Publication No. 2001-060194

SUMMARY

According to an aspect of the embodiments, a selection option information presentation system includes a first display device, a second display device, and a control device. The control device includes a processor configured to execute a process. The process includes: displaying plural items of selection option information on the first display device in states in which a selection operation can be received, and, at a specific timing in a duration in which no selection operation is detected, modifying and displaying a display position of at least one or more items of selection option information set as a display target such that a combination of adjacent items of selection option information within a display region forms a combination in which a display position differs in an up-down direction or a left-right direction, or both; and, when a selection operation of any of the plural items of selection option information displayed on the first display device has been received, displaying the selection option information that received the selection operation on the second display device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of a card database (DB) of the first exemplary embodiment;

FIG. 8 is a diagram illustrating an example of a card display position DB of the first exemplary embodiment;

FIG. 9 is a diagram illustrating an example of a background DB;

FIG. 10 is a diagram illustrating an example of a vision DB;

FIG. 26 is a diagram illustrating an example of a card display position DB of the second exemplary embodiment;

FIG. 27 is a diagram illustrating an example of a card DB of a third exemplary embodiment.

DESCRIPTION OF EMBODIMENTS

Detailed explanation follows regarding an exemplary embodiment according to technology disclosed herein, with reference to the drawings. In each of the exemplary embodiments below, explanation is given regarding examples of cases in which desires of a user (enterprise) are extracted using information and communication technology (ICT) to solve problems inside and outside a company.

First Exemplary Embodiment

Figure 1:
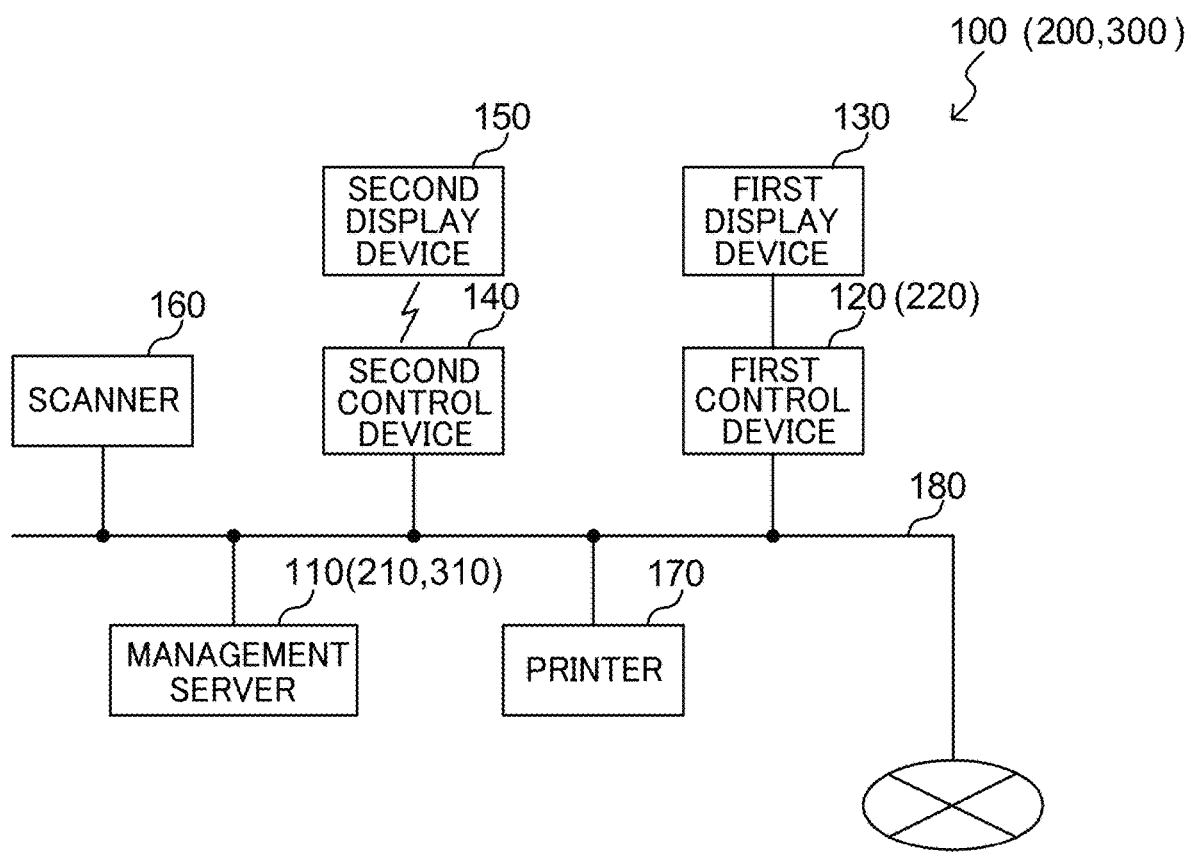
FIG. 1 is a block diagram illustrating a schematic configuration of a selection option information presentation system according to a first to a third exemplary embodiment.

As illustrated in FIG. 1, a selection option information presentation system 100 according to a first exemplary embodiment includes a management server 110, a first control device 120, a first display device 130, a second control device 140, a second display device 150, a scanner 160, and a printer 170. The management server 110, the first control device 120, the second control device 140, the scanner 160, and the printer 170 are connected to one another by a hub 180. The connections between each device and the hub may be wired or may be wireless. The first control device 120 is connected to the first display device 130, and the second control device 140 is connected to the second display device 150. Likewise, these connections may be wired or may be wireless.

The management server 110 is an information processing device such as a general server device or a personal computer. The management server 110 manages various information employed by the selection option information presentation system 100, and respectively instructs the first control device 120, the second control device 140, the scanner 160, and the printer 170 to execute various processing.

The first display device 130 includes a display section that displays plural selection option cards (described in detail below), and an operation section that receives user operations made on the displayed selection option cards. The first display device 130 may, for example, be implemented by a touch panel display.

The first control device 120 controls display on the first display device 130, processing of information received via the first display device 130, and communication with the management server 110.

The second display device 150 includes a display section that displays a vision (described in detail below) representing a user desire using selection option cards, and an operation section that receives user operations on the displayed selection option cards. The second display device 150 may, for example, be implemented by a touch panel display.

The second control device 140 controls display on the second display device 150, processing of information received via the second display device 150, and communication with the management server 110.

Explanation follows regarding selection option cards and visions.

Figure 2:
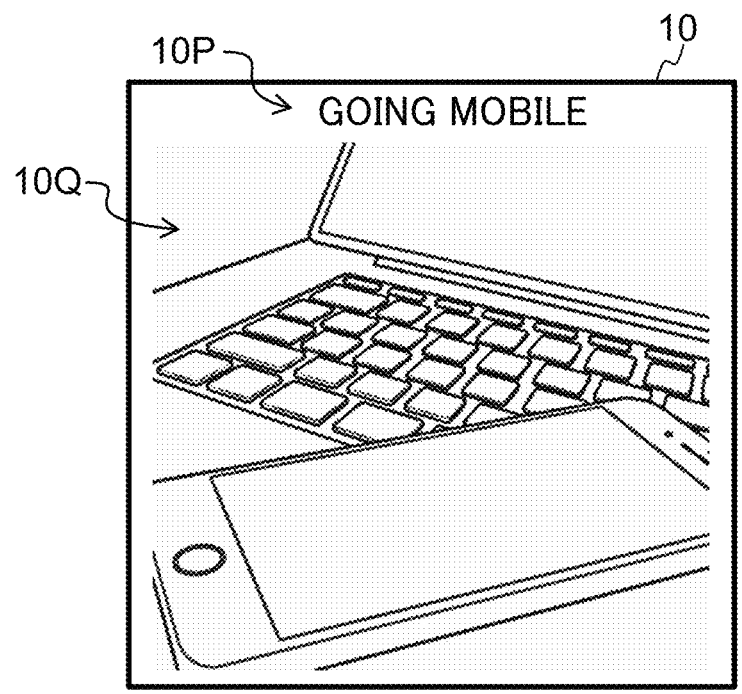
FIG. 2 is a diagram illustrating an example of a selection option card.

Selection option cards are cards in which various selection options for extracting user desires are each electronically displayed by a single card using a keyword and an image such as a photograph or an illustration. FIG. 2 illustrates an example of a selection option card 10. In the example of FIG. 2, the selection option card 10 includes a keyword 10P and an illustration 10Q indicating the selection option represented by that selection option card 10. Various content can be applied in the selection option represented by the selection option cards 10, and examples include content related to facilities, content related to work methods, content in which ICT may be employed, and content unrelated to ICT. Moreover, the selection option card 10 may include the keyword 10P alone, or the illustration 10Q alone.

Figure 3:
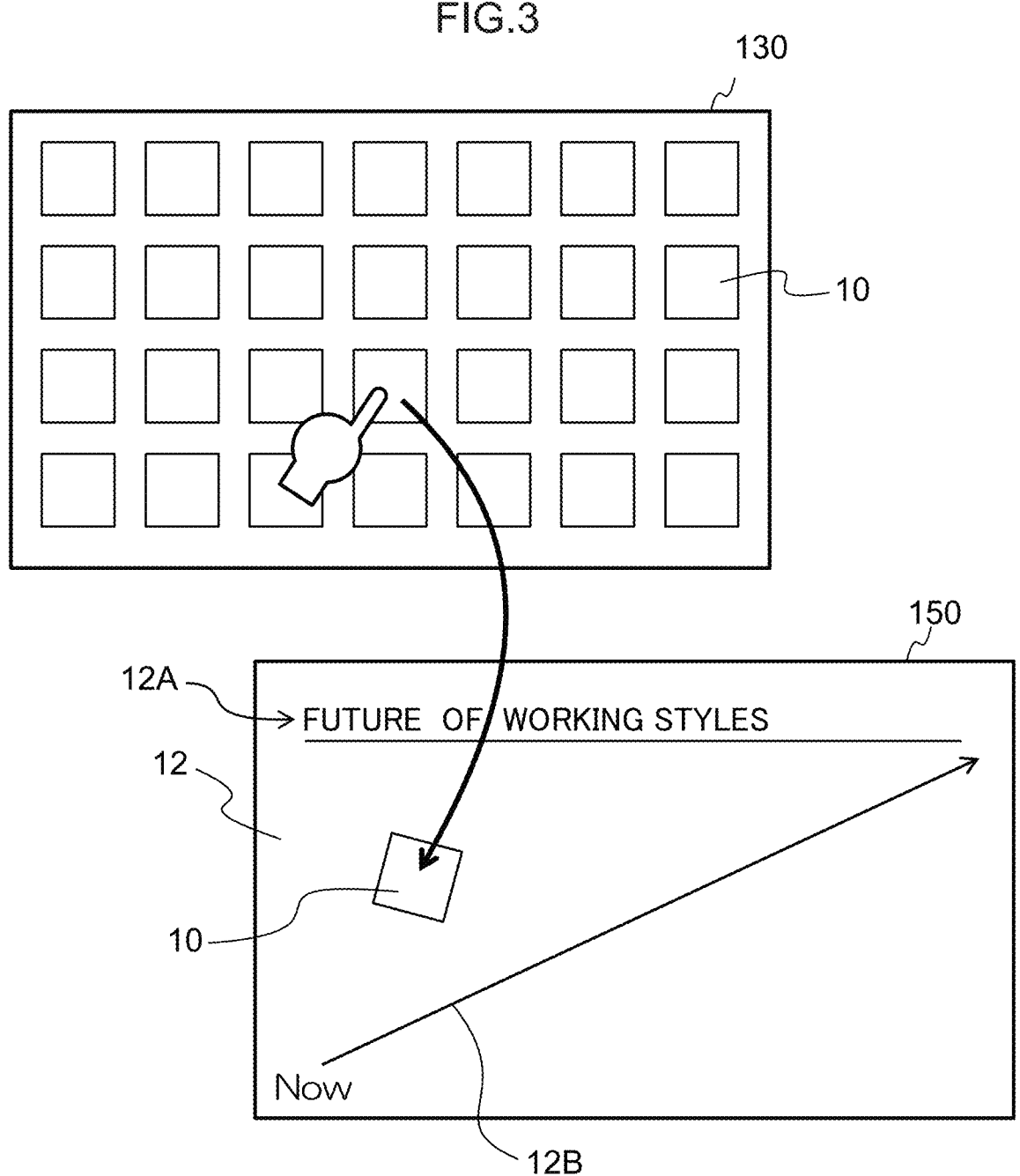
FIG. 3 is a diagram for explaining an outline of a selection option information presentation system.

The number of the selection option cards 10 prepared is the number of selection options, and, as illustrated in FIG. 3, the plural selection option cards 10 are displayed on the first display device 130 in a state enabling operations, including selection operations, to be received from the user. The user views the plural selection option cards 10 displayed on the first display device 130, and selects a selection option card 10 relating to their desire.

Figure 4:
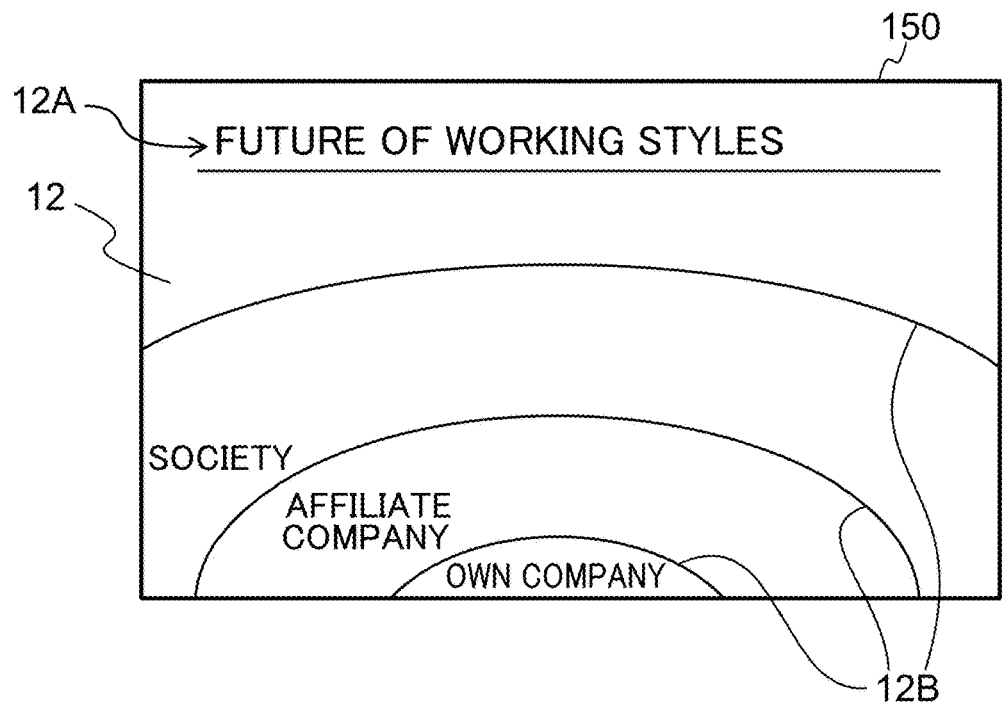
FIG. 4 is a diagram illustrating another example of background axes.
Figure 5:
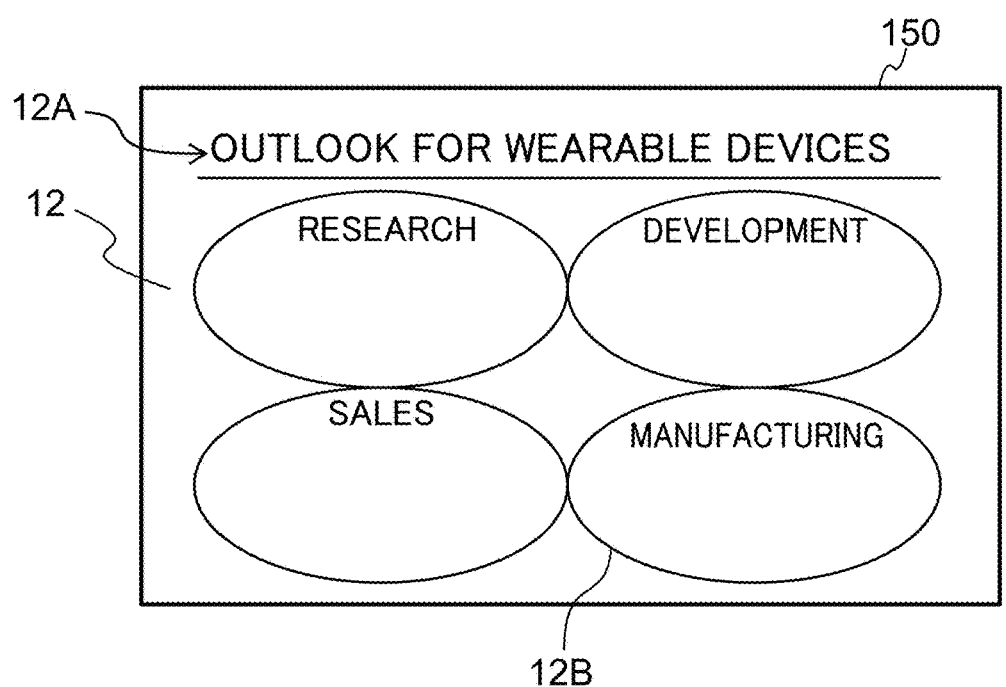
FIG. 5 is a diagram illustrating another example of background axes.

A vision that represents a user desire using selection option cards 10 is displayed on the second display device 150. The vision includes a background 12 selected according to a user desire. The background 12 includes a region 12A for inputting a title, and an axis 12B representing passage of time or the like. In the example of FIG. 3, a time axis spanning from now to the future is employed as an example of the axis 12B. The axis 12B is not limited to displaying a long-term time axis as illustrated in the example of FIG. 3, and may display a single day as "morning", "noon", and "night" on a time axis. Moreover, the axis 12B is not limited to representing passage of time, and axes 12B may, for example, represent different roles such as "own company", "affiliate company", and "society" as illustrated in FIG. 4. Moreover, as illustrated in FIG. 5, the axes 12B may represent different divisions, such as "research". "development". "manufacturing", and "sales". Other examples that axes 12B may be used to represent include different places such as "in-office", "another office", and "outside the company".

Moreover, visions may be drawn using a handwriting tool.

Selection option cards 10 selected using the first display device 130 are displayed on the background 12 displayed on the second display device 150. The user considers the axis 12B and disposes the displayed selection option cards 10 at appropriate positions. A vision representing user desire is thus drawn up by disposing the selection option cards 10 on the background 12 that includes the axis 12B.

Detailed description follows regarding each device of the selection option information presentation system 100.

Figure 6:
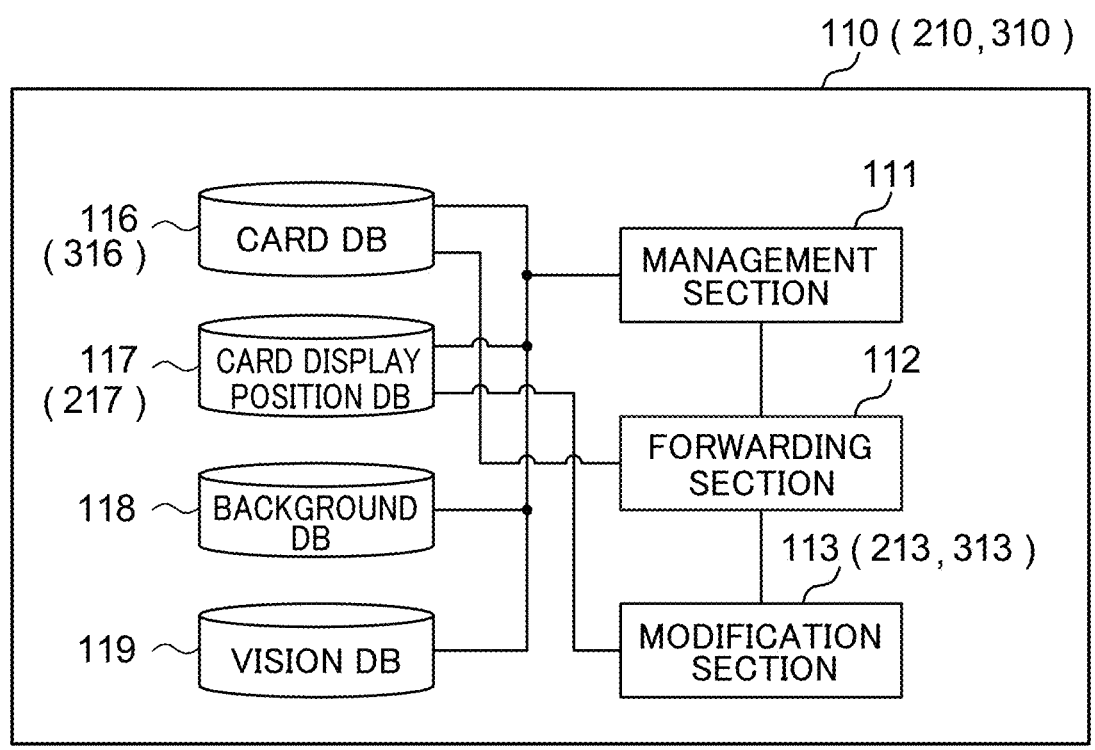
FIG. 6 is a functional block diagram illustrating a schematic configuration of a management server.

As illustrated in FIG. 6, the management server 110 includes a management section 111, a forwarding section 112, and a modification section 113 as functional sections. A card database (DB) 116, a card display position DB 117, a background DB 118, and a vision DB 119 are stored in a specific storage region of the management server 110.

Card information for each selection option card 10 is stored in the card DB 116. FIG. 7 illustrates an example of the card DB 116. In the example of FIG. 7, each row corresponds to card information for a single selection option card 10. Each item of card information includes information such as a "card ID" serving as identification information for the selection option card 10, a "keyword" displayed on the selection option card 10, and "image data" such as a photograph or illustration that is displayed on the selection option card 10.

The display position of each of the selection option cards 10 is stored in the card display position DB 117 when plural selection option cards 10 are each displayed on the first display device 130. FIG. 8 illustrates an example of the card display position DB 117. In the example of FIG. 8, a card ID for each of the selection option cards 10 is stored in association with the display position of that selection option card 10 on the first display device 130. For example, a coordinate system may be set, with the top left corner of the display region of the first display device 130 as the origin, the rightward direction as the positive direction of the x-axis, and the downward direction as the positive direction of the y-axis. Then, the display position of a specific location (for example, the top left corner) of the selection option card 10 is represented using a coordinate value in the xy-coordinate system set for the display region of the first display device 130.

Information regarding respective backgrounds 12 displayed on the second display device 150 are stored in the background DB 118. FIG. 9 illustrates an example of the background DB 118. In the example of FIG. 9, each row corresponds to background information for a single background 12. Each item of background information includes information such as a "background ID" serving as identification information of the background 12, and "image data" of the background 12 that includes the axis 12B.

Vision information generated by the user on the second display device 150 is stored in the vision DB 119. FIG. 10 illustrates an example of the vision DB 119. In the example of FIG. 10, each row corresponds to vision information indicating a single vision. Each item of vision information includes information of a "vision ID" serving as identification information of the vision, a "user ID" serving as identification information of the user who generated the vision, and a "background ID" of the background 12 displayed on the second display device 150. Moreover, the vision information includes information such as the "card ID" of the selection option cards 10 that are selected, and the "display position" indicating the position at which the respective selection option cards 10 are displayed on the background 12. The "display position" can be represented using a coordinate value on an xy-coordinate system set for the background 12 region displayed on the second display device 150, similarly to the display position of the selection option card 10 displayed on the first display device 130 described above. The vision information further includes information such as a "title" input as text data, and "handwritten data" indicating an image that is drawn using a handwriting tool. Note that the title may also be input as handwritten data. The presentation system 100 newly appends a vision ID and stores the vision information when the user operates via the second display device 150, and a storage instruction has been received for vision data that includes plural items of selection option card 10 information. Accordingly, when a first user generates plural types of vision information using different background IDs, plural vision IDs are stored in association with the user ID of the first user. Data items other than those illustrated in the example of FIG. 10 may also be stored in the vision DB 119 in association with the vision IDs. For example, information indicating the date and time at which the vision was stored may also be stored.

When an instruction has been made to initiate a service provided by the selection option information presentation system 100, the management section 111 acquires the card information of each of the selection option cards 10 from the card DB 116, and acquires the card display position information of each of the selection option cards 10 from the card display position DB 117. The management section 11 transmits the acquired card information and card display position information to the first control device 120. The management section 111 also acquires an item of background information from the background DB 118, and transmits the acquired background information to the second control device 140. The background information transmitted to the second control device 140 may be predetermined background information, may be randomly selected background information, or may be background information selected by the user.

When the management section 111 has received the vision information transmitted from the second control device 140, the management section 111 appends a vision ID to the received vision information, and stores the received vision information in the vision DB 119.

From the first control device 120, the forwarding section 112 receives selection information indicating information regarding selection option cards 10 that have been selected from the selection option cards 10 displayed on the first display device 130. The forwarding section 112 forwards the card information of selection option cards 10 indicated by received selection information to the second control device 140.

From the first control device 120, the modification section 113 receives operation information indicating operations performed by the user on the selection option cards 10 displayed on the first display device 130. Note that the selection information described above is a single item of operation information. Based on a reception state of the operation information, the modification section 113 determines whether or not a specific duration has passed since a user operation on the selection option cards 10 was last detected. In cases in which the specific duration has passed, the modification section 113 randomly chooses at least one selection option card 10 from the plural selection option cards 10. Then, the modification section 113 modifies the display position of the chosen selection option card 10 such that a combination of adjacent selection option cards 10 in the display region forms a combination in which a display position differs in the up-down direction, the left-right direction, or both. From out of the card display position information stored in the card display position DB 117, the modification section 113 updates the card display position information of the selection option card 10 for which the display position has been modified, and transmits the updated card display position information to the first control device 120.

Figure 11:
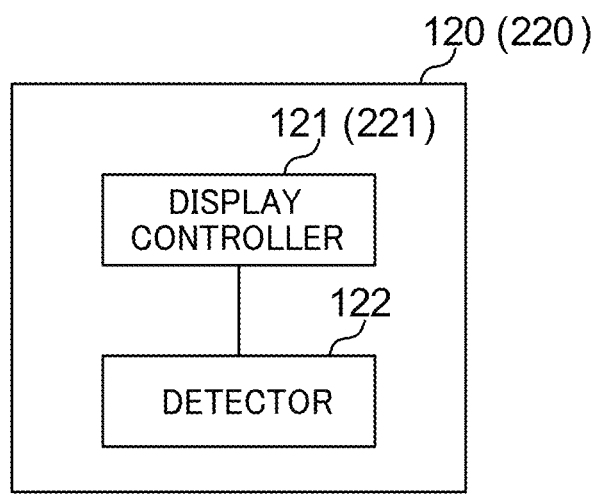
FIG. 11 is a functional block diagram illustrating a schematic configuration of a first control device.

As illustrated in FIG. 11, the first control device 120 includes a display controller 121, and a detector 122 as functional sections.

The display controller 121 receives the card information and the card display position information transmitted from the management server 110, and controls the first display device 130 such that each selection option card 10 indicated by the card information is displayed at the display position indicated by the card display position information. Moreover, in cases in which only card display position information has been received from the management server 110, the display controller 121 modifies the display position of a selection option card 10 being displayed on the first display device 130 based on the received card display position information. Note that the display size of each selection option card 10 may be a predetermined size, or may be a size calculated such that a specific number of selection option cards 10 are displayed on the first display device 130.

Moreover, in cases in which enlarged display of a selection option card 10 has been instructed from the detector 122, the display controller 121 enlarges the display size of a designated selection option card 10. For example, the display size of the designated selection option card 10 may be vertically and horizontally enlarged by a predetermined number of pixels each time display enlargement is instructed, or may be enlarged by a specific factor of the current display size (for example, a factor of 1.1). Moreover, together with enlarging display of the designated selection option card 10, the display controller 121 moves the display position of selection option cards 10 surrounding the selection option card 10 being displayed enlarged, to positions that avoid the selection option card 10 being displayed enlarged. Determination of the positions of the surrounding selection option cards 10 after having moved may employ conventionally known image placement optimization technology or the like. Note that there is no limitation to cases in which the positions the surrounding selection option cards 10 are moved in order to avoid the selection option card 10 being displayed enlarged, and the selection option card 10 being displayed enlarged may be superimposed on the surrounding selection option cards 10. When an instruction to end enlarged display has been made by the detector 122, the display controller 121 returns the display size of the selection option card 10 being displayed enlarged to its original display size, and returns the positions of the surrounding selection option cards 10 to their original display positions.

When the display position of the selection option card 10 is modified, the display controller 121 may instantly display the selection option card at the post-modification display position, or may display an animated display of a situation where the selection option card 10 moves from its original position to a modification-destination position. In the latter case, since movement occurs on the screen when modifying the display position of the selection option card 10, the attention of the user is easily drawn to the selection option card 10 for which the display position was modified and the selection option cards 10 surrounding that selection option card 10, and the nature of the modification is also easily understood.

The detector 122 detects user operations on the selection option cards 10 displayed on the first display device 130. More specifically, the detector 122 detects whether or not a selection option card 10 has been touched by the user, whether or not the touch is continuing, and whether or not the time for which the touch has continued has exceeded a specific amount of time. When the detector 122 has detected that a selection option card 10 has been touched, the detector 122 transmits operation information indicating touch has been detected to the management server 110. When the detector 122 has detected that the touch is continuing, an instruction is made to the display controller 121 to designate the selection option card 10 being touched for display enlargement. The detector 122 continues to instruct the display controller 121 to perform display enlargement until the touch has continued for a time exceeding the specific amount of time. When the detector 122 has detected that the touch has continued for a time exceeding the specific amount of time (for example, three seconds), the card ID of the touched selection option card 10 is transmitted to the management server 110 as selection information, and the display controller 121 is instructed to end enlarged display.

Figure 12:
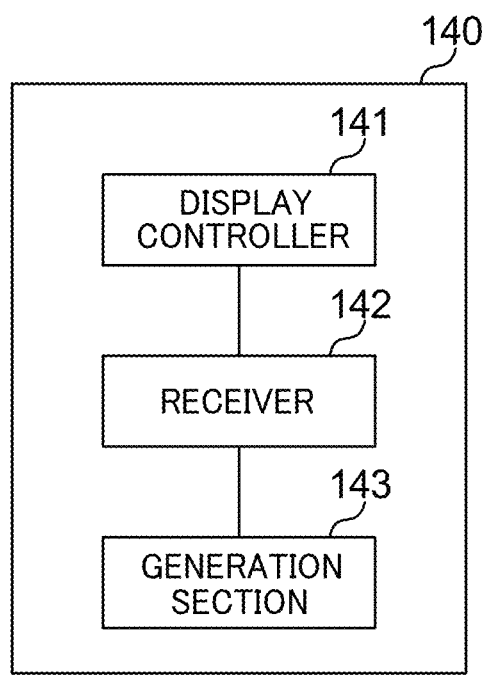
FIG. 12 is a functional block diagram illustrating a schematic configuration of a second control device.

As illustrated in FIG. 12, the second control device 140 includes a display controller 141, a receiver 142, and a generation section 143 as functional sections.

When the display controller 141 has received background information transmitted from the management server 110, the display controller 141 displays the background 12 indicated by the received background information on the second display device 150. Moreover, when the display controller 141 has received card information from the management server 110, the display controller 141 displays the selection option cards 10 indicated by the received card information on the background 12. The position at which the selection option cards 10 are displayed may be chosen at random, or the selection option cards 10 may be displayed at predetermined positions.

Moreover, when the display controller 141 has been notified of received information (described in detail below) from the receiver 142, the display controller 141 modifies the display positions and display sizes of the selection option cards 10, displays inputted text data, displays drawn images, and the like, based on the received information.

The receiver 142 receives user operations such as modifications to the display positions and modifications to the display sizes of the selection option cards 10 displayed on the second display device 150, input of text data, and drawings made using the handwriting tool. The receiver 142 notifies the received information indicating contents of the received user operations to the display controller 141.

When the generation section 143 has been instructed to finalize a vision by the user, the generation section 143 acquires the display position of each of the selection option cards 10 on the background 12 displayed on the second display device 150. The generation section 143 then generates vision information including the background ID of the background 12 displayed on the second display device 150, the card IDs of the selection option cards 10, the acquired display positions of the selection option cards 10, the inputted text data, and the drawn handwritten data. The generation section 143 acquires the user ID of the user who generated the vision from login information, registration information employed when the system was used, or the like, and appends the user ID to the generated vision information and transmits the vision information to the management server 110.

Figure 13:
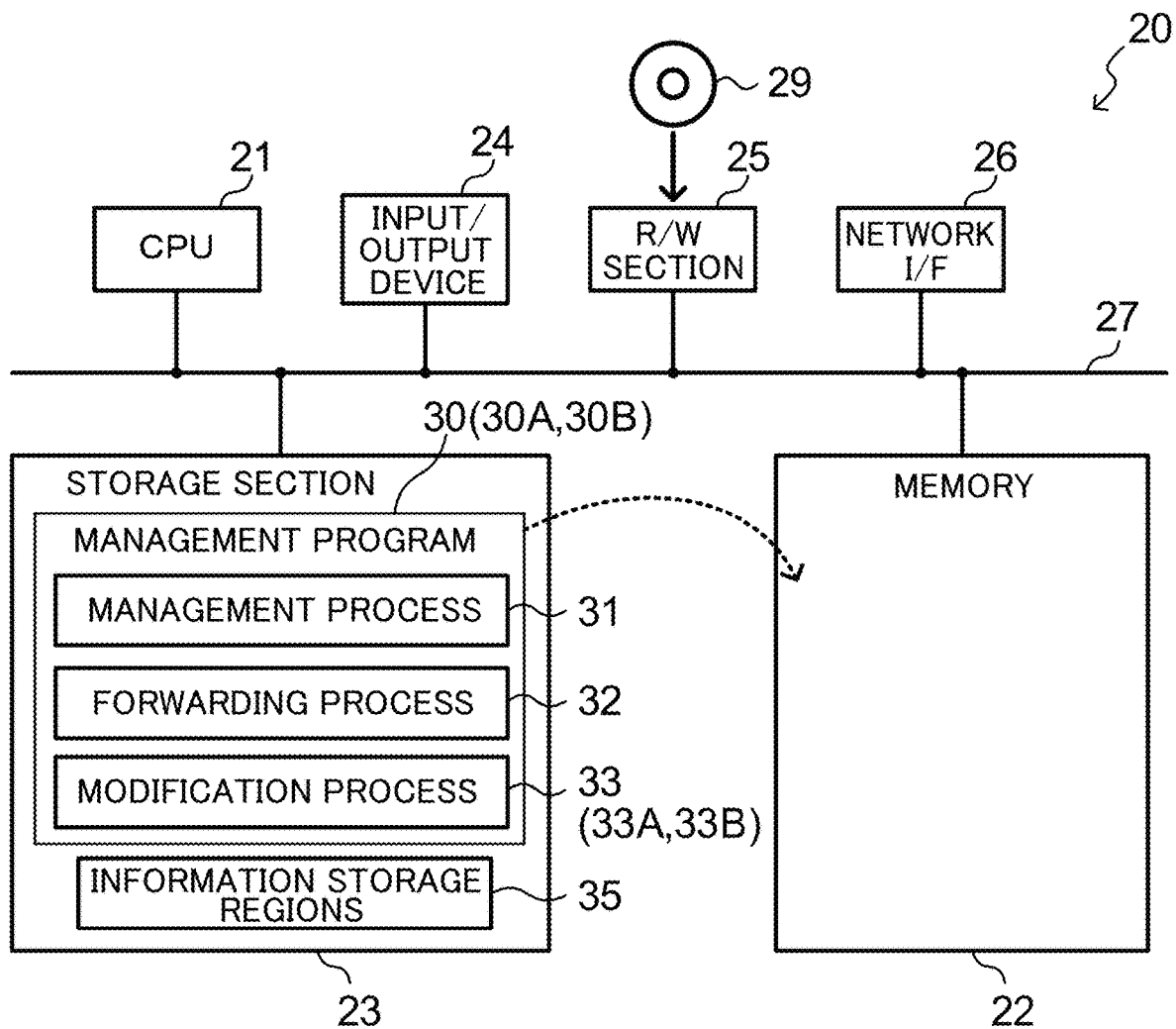
FIG. 13 is a block diagram illustrating a schematic configuration of a computer that functions as the management server.

The management server 110 may, for example, be implemented by the computer 20 illustrated in FIG. 13. The computer 20 includes a CPU 21, memory 22 serving as a temporary storage region, and a non-volatile storage section 23. The computer 20 includes an input/output device 24, a read/write (R/W) section 25 that controls reading data from and writing data to a recording medium 29, and a network interface (I/F) 26 connected to a network such as the Internet. The CPU 21, the memory 22, the storage section 23, the input/output device 24, the R/W section 25, and the network I/F 26 are connected to one another through a bus 27.

The storage section 23 may be implemented by a hard disk drive (HDD), a solid state drive (SSD), flash memory, or the like. A management program 30 that causes the computer 20 to function as the management server 110 is stored in the storage section 23, which serves as a storage medium. The management program 30 includes a management process 31, a forwarding process 32, and a modification process 33. The storage section 23 includes an information storage region 35 storing items of information that respectively form the card DB 116, the card display position DB 117, the background DB 118, and the vision DB 119.

The CPU 21 reads the management program 30 from the storage section 23, expands the management program 30 into the memory 22, and sequentially executes the processes included in the management program 30. The CPU 21 operates as the management section 111 illustrated in FIG. 6 by executing the management process 31. The CPU 21 also operates as the forwarding section 112 illustrated in FIG. 6 by executing the forwarding process 32. The CPU 21 also operates as the modification section 113 illustrated in FIG. 6 by executing the modification process 33. The CPU 21 respectively reads the items of information from the information storage regions 35, and respectively expands the card DB 116, the card display position DB 117, the background DB 118, and the vision DB 119 into the memory 22. The computer 20, which executes the management program 30, thereby functions as the management server 110.

Figure 14:
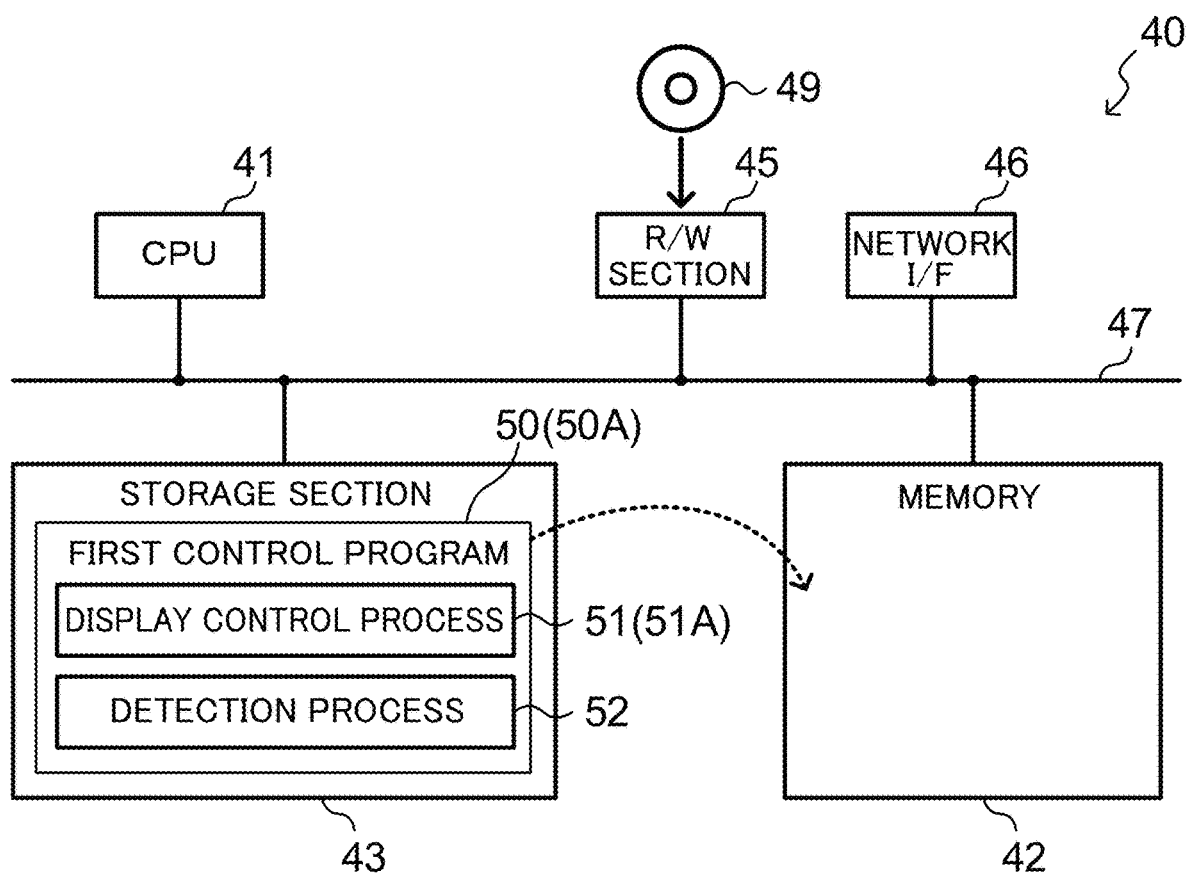
FIG. 14 is a block diagram illustrating a schematic configuration of a computer that functions as the first control device.

The first control device 120 may, for example, be implemented by the computer 40 illustrated in FIG. 14. The computer 40 includes a CPU 41, memory 42 serving as a temporary storage region, and a non-volatile storage section 43. The computer 40 further includes an R/W section 45 that controls reading data from and writing data to a recording medium 49, and a network I/F 46. The CPU 41, the memory 42, the storage section 43, the R/W section 45, and the network I/F 46 are connected to one another through a bus 47. Moreover, the computer 40 is connected to the first display device 130 through the network I/F 46.

The storage section 43 may be implemented by a HDD, an SSD, flash memory, or the like. A first control program 50 for causing the computer 40 to function as the first control device 120 is stored in the storage section 43, which serves as a storage medium. The first control program 50 includes a display control process 51, and a detection process 52.

The CPU 41 reads the first control program 50 from the storage section 43, expands the first control program 50 into the memory 42, and sequentially executes the processes included in the first control program 50. The CPU 41 operates as the display controller 121 illustrated in FIG. 11 by executing the display control process 51. The CPU 41 also operates as the detector 122 illustrated in FIG. 11 by executing the detection process 52. The computer 40, which executes the first control program 50, thereby functions as the first control device 120.

Figure 15:
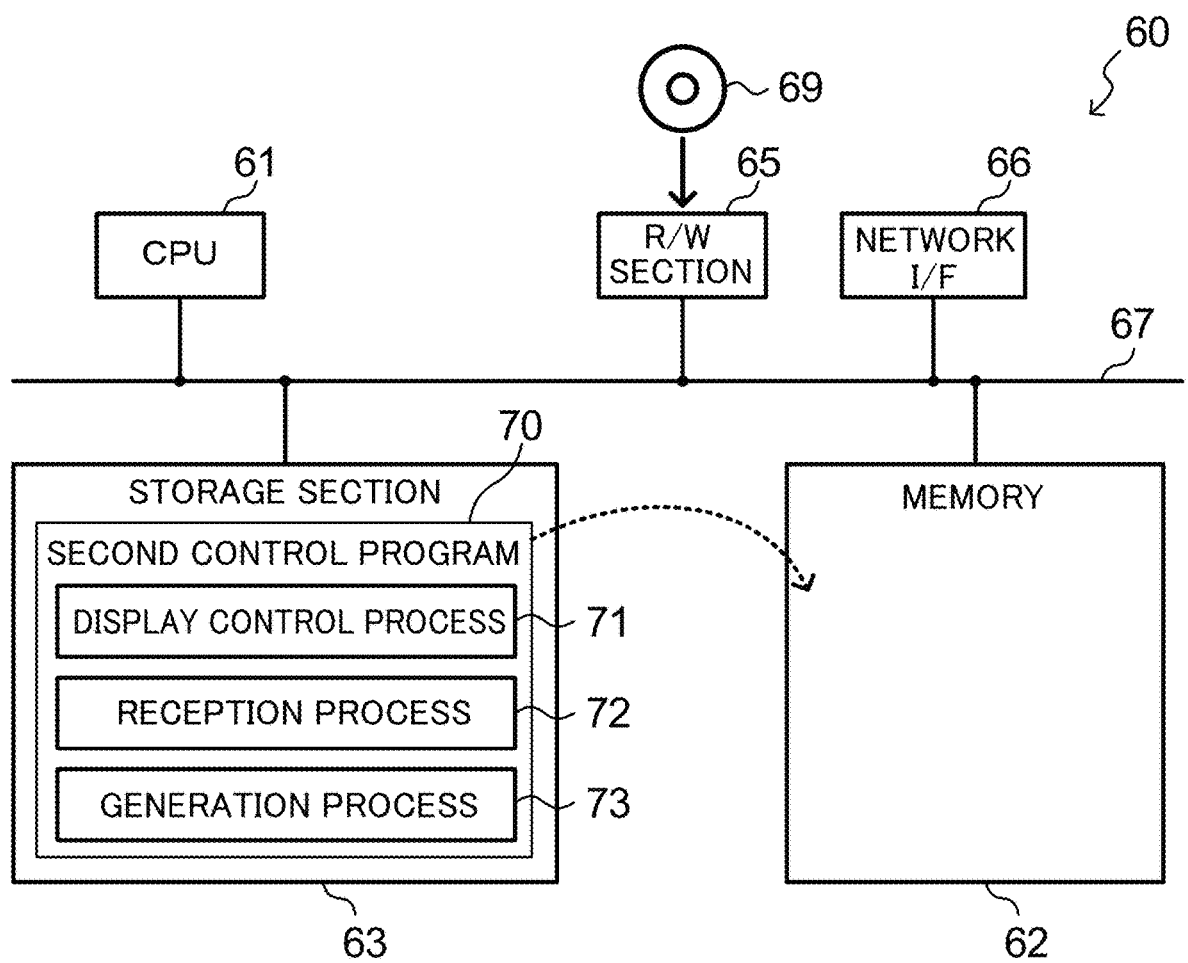
FIG. 15 is a block diagram illustrating a schematic configuration of a computer that functions as the second control device.

The second control device 140 may, for example, be implemented by the computer 60 illustrated in FIG. 15. The computer 60 includes a CPU 61, memory 62 serving as a temporary storage region, and a non-volatile storage section 63. The computer 60 further includes an R/W section 65 that controls reading of data from and writing of data to a recording medium 69, and a network I/F 66. The CPU 61, the memory 62, the storage section 63, the R/W section 65, and the network I/F 66 are connected to one another through a bus 67. Moreover, the computer 60 is connected to the second display device 150 via the network I/F 66.

The storage section 63 may be implemented by a HDD, an SSD, flash memory, or the like. A second control program 70 for causing the computer 60 to function as the second control device 140 is stored in the storage section 63, which serves as a storage medium. The second control program 70 includes a display control process 71, a reception process 72, and a generation process 73.

The CPU 61 reads the second control program 70 from the storage section 63, expands the second control program 70 into the memory 62, and sequentially executes the processes included in the second control program 70. The CPU 61 operates as the display controller 141 illustrated in FIG. 12 by executing the display control process 71. The CPU 61 also operates as the receiver 142 illustrated in FIG. 12 by executing the reception process 72. The CPU 61 also operates as the generation section 143 illustrated in FIG. 12 by executing the generation process 73. The computer 60, which executes the second control program 70, thereby functions as the second control device 140.

Note that the functionality respectively implemented by the management program 30, the first control program 50, and the second control program 70 may, for example, be implemented by a semiconductor integrated circuit, and more specifically, by an application specific integrated circuit (ASIC) or the like.

Figure 17:
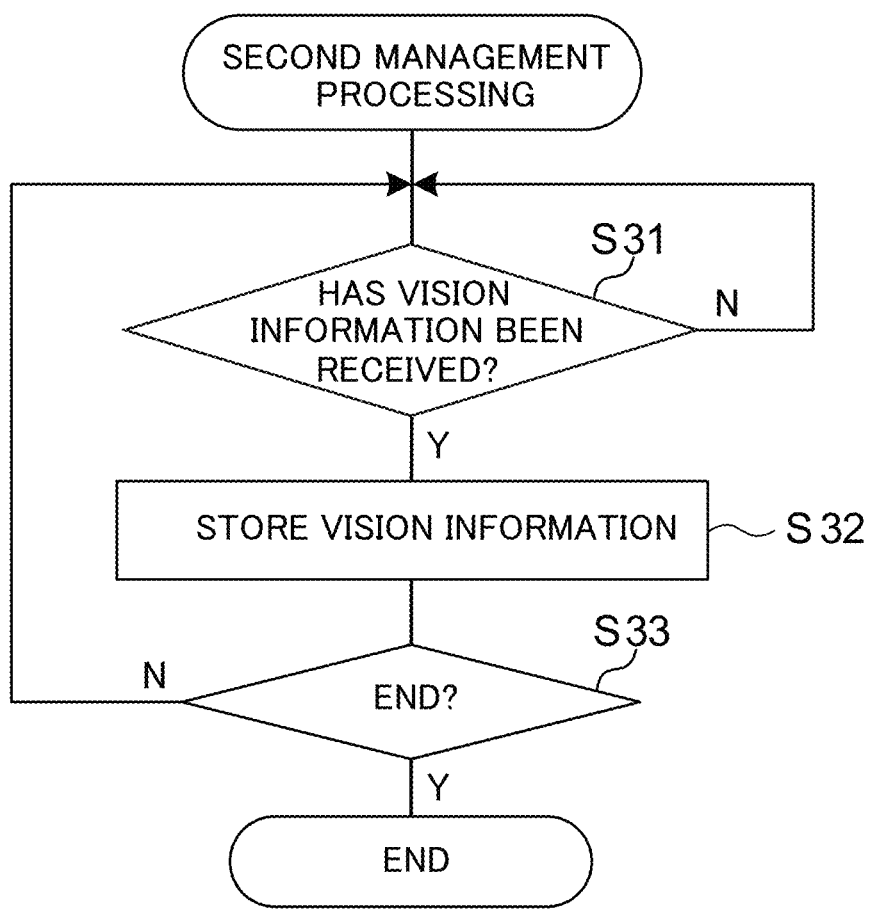
FIG. 17 is a flowchart illustrating an example of second management processing.
Figure 18:
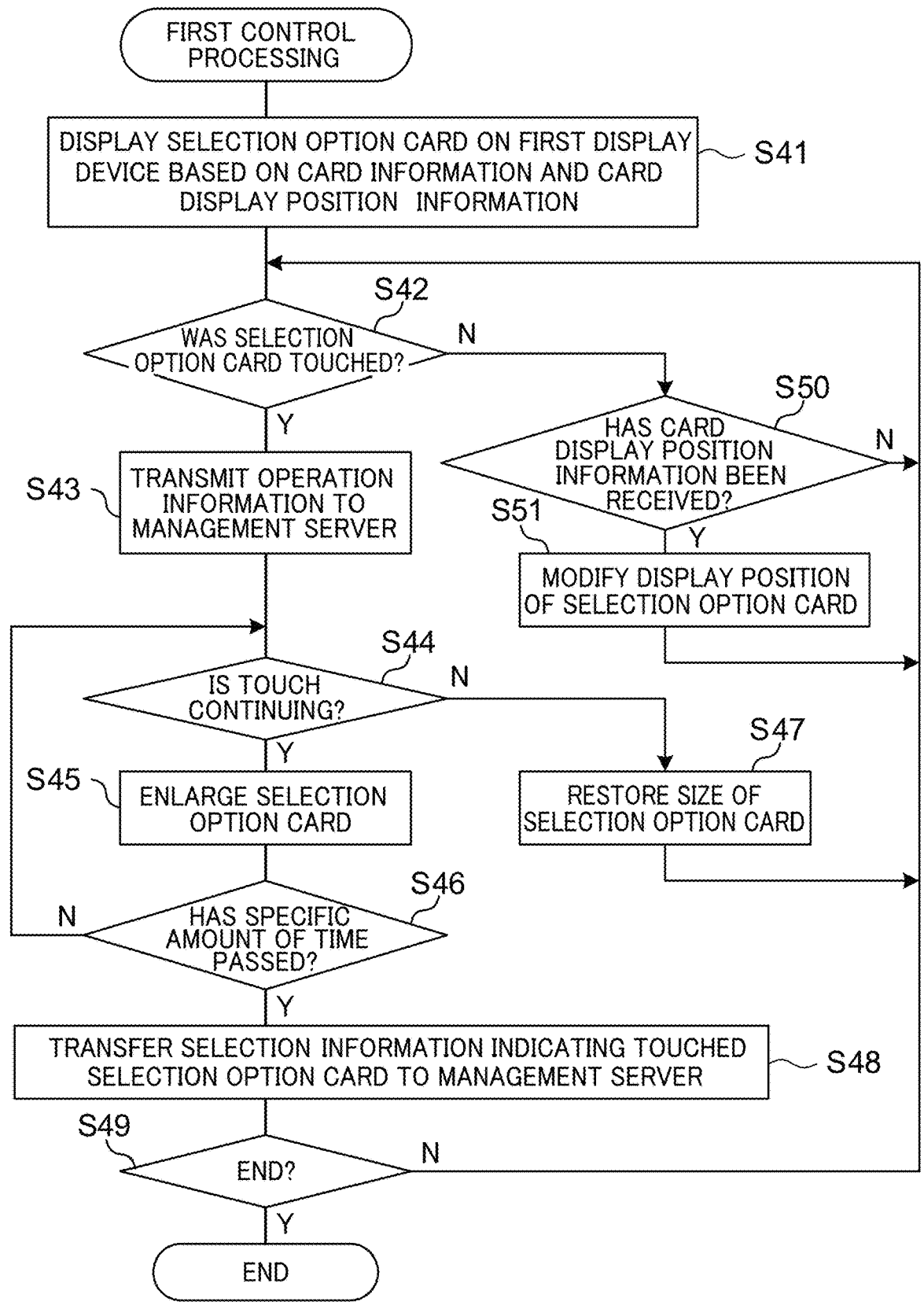
FIG. 18 is a flowchart illustrating an example of first control processing.
Figure 23:
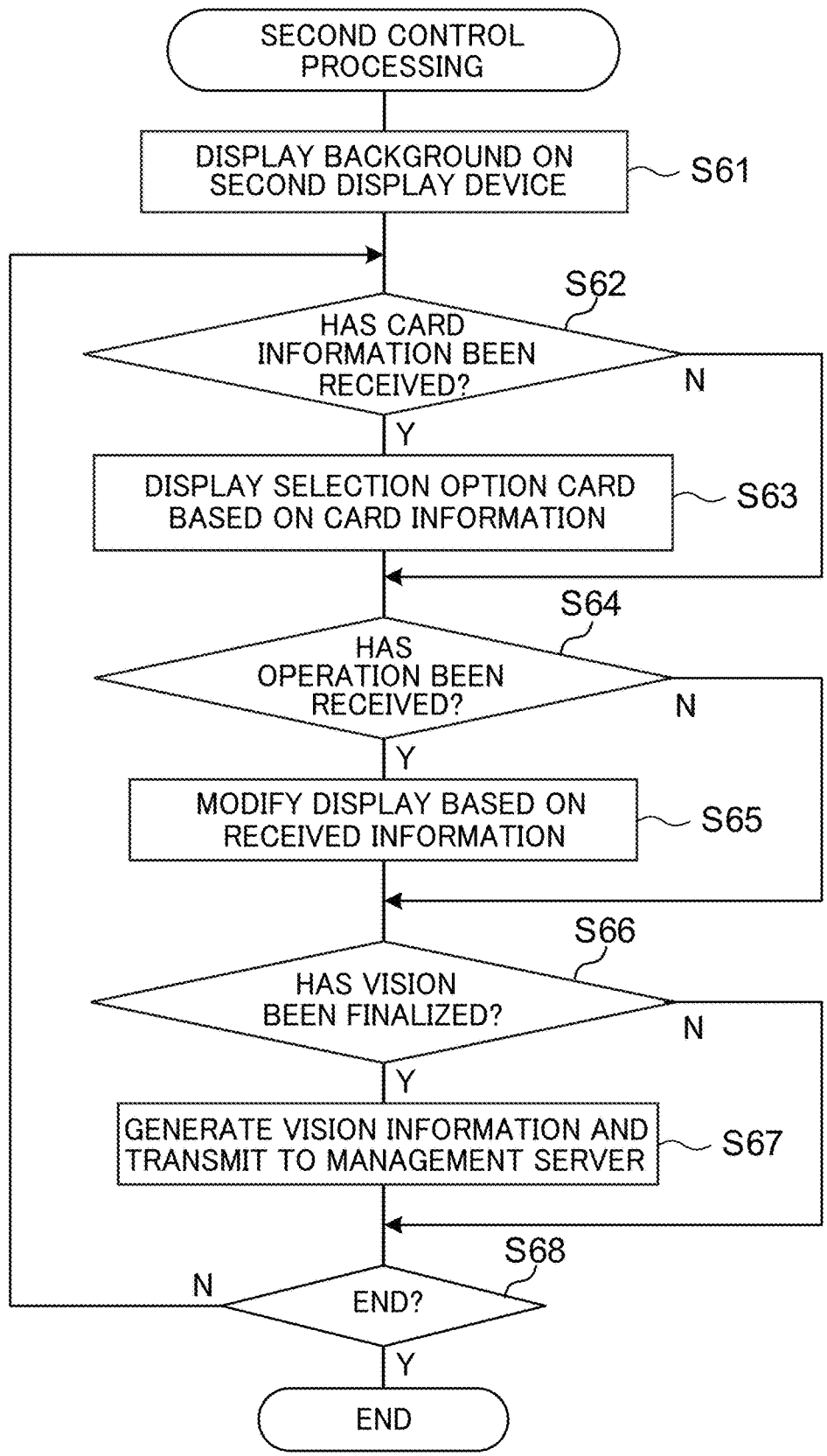
FIG. 23 is a flowchart illustrating an example of second control processing.

Next, explanation follows regarding operation of the selection option information presentation system 100 according to the first exemplary embodiment. When an instruction to initiate a service provided by the selection option information presentation system 100 has been made, the first management processing illustrated in FIG. 16, and the second management processing illustrated in FIG. 17 are executed in the management server 110. The first control processing illustrated in FIG. 18 is executed in the first control device 120. The second control processing illustrated in FIG. 23 is executed in the second control device 140. Detailed description follows regarding each type of processing.

Figure 16:
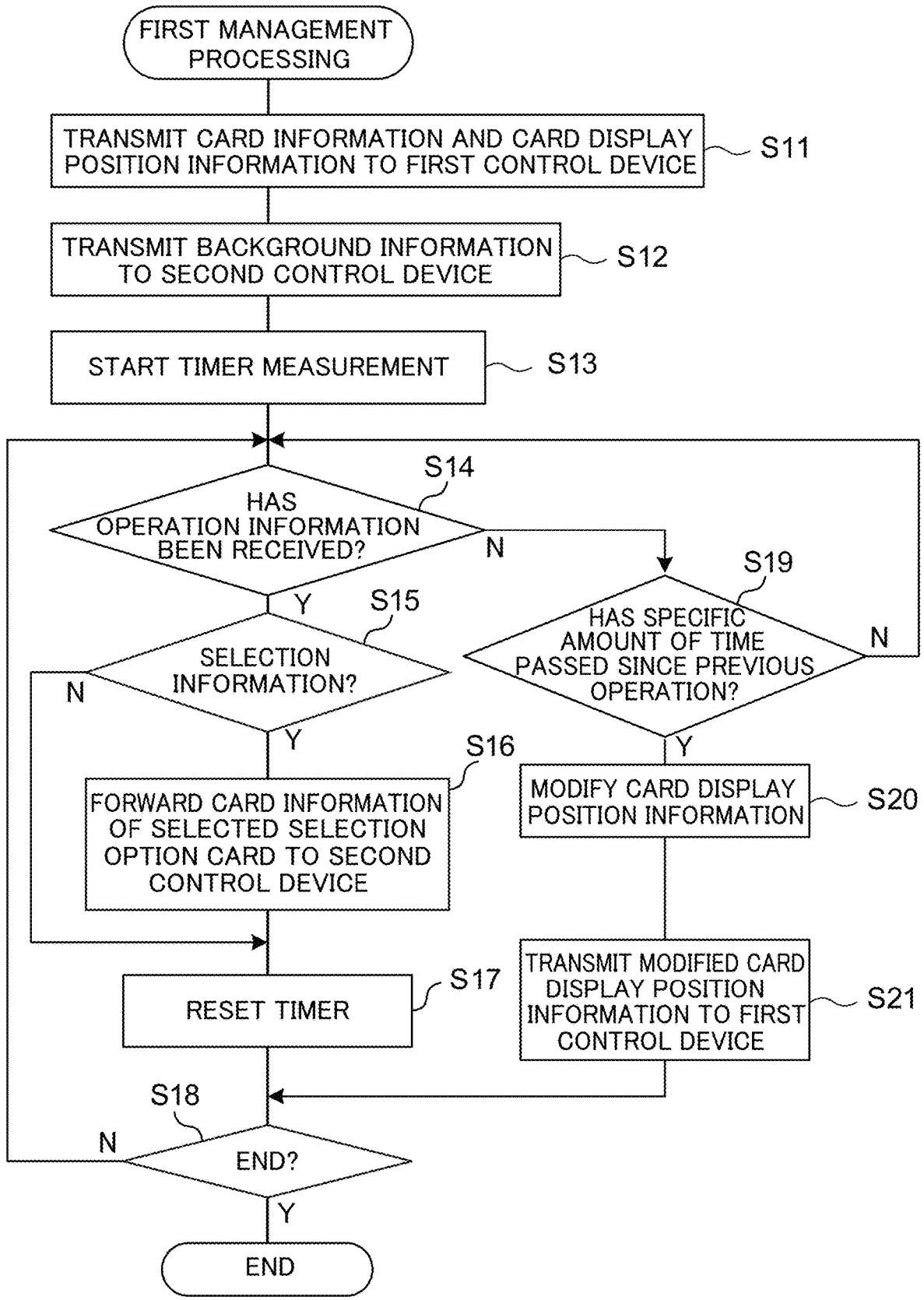
FIG. 16 is a flowchart illustrating an example of first management processing.

First, explanation follows regarding the first management processing illustrated in FIG. 16. At step S11, the management section 111 acquires card information of each of the selection option cards 10 from the card DB 116, and acquires the card display position information of each of the selection option cards 10 from the card display position DB 117. The management section 11 then transmits the acquired card information and card display position information to the first control device 120.

Next, at step S12, the management section 111 acquires an item of background information from the background DB 118, and transmits the acquired background information to the second control device 140.

Next, at step S13, the modification section 113 starts a timer for measuring a duration since a user operation on the selection option cards 10 displayed on the first display device 130 was last detected, and initiates a measurement of the passage of time.

Next, at step S14, the modification section 113 determines whether or not operation information, indicating an operation performed by the user on a selection option card 10 displayed on the first display device 130, has been received from the first control device 120. In cases in which operation information has been received, processing transitions to step S15.

At step S15, the forwarding section 112 determines whether or not the operation information received at step S14 above is selection information that includes the card ID of the selection option card 10 selected from the selection option cards 10 displayed on the first display device 130. In cases in which the received operation information is selection information, processing transitions to step S16, and the forwarding section 112 acquires the card information of the selection option card 10 indicated by the received selection information from the card DB 116 and forwards the acquired card information to the second control device 140, and processing then transitions to step S17.

However, in cases in which the operation information received at step S14 above is not selection information, namely, cases in which the received operation information is operation information indicating that a touch to a selection option card 10 was detected, the processing of step S16 is skipped, and processing transitions to step S17.

At step S17, the modification section 113 resets the measurement of the timer. Next, at step S18, the management section 111 determines whether or not an instruction to end the service provided by the selection option information presentation system 100 has been made, and processing returns to step S14 in cases in which an instruction to end the service has not been made.

At step S14, processing transitions to step S19 in cases in which the modification section 113 has determined that operation information has not been received. At step S19, the modification section 113 determines whether or not the measurement value of the timer has exceeded a predetermined specific amount of time (for example, one minute), and thereby determines whether or not a specific duration has passed since a user operation on the selection option cards 10 was last detected. Processing returns to step S14 in cases in which the measurement value of the timer has not exceeded the specific amount of time, and processing transitions to step S20 in cases in which the specific amount of time has passed.

At step S20, the modification section 113 randomly chooses at least one selection option card 10 from the plural selection option cards 10. The modification section 113 then modifies the display position of the chosen selection option card 10 such that a combination of adjacent selection option cards 10 in the display region forms a combination in which a display position differs in the up-down direction, the left-right direction, or both. Out of the card display position information stored in the card display position DB 117, the modification section 113 updates the card display position information of the selection option cards 10 for which the modified display position has been modified.

Next, at step S21, the modification section 113 acquires card display position information of each of the selection option cards 10, from the card display position DB 117. The modification section 113 then transmits the acquired card display position information to the first control device 120, and processing transitions to step S18.

At step S18, the management section 111 ends the first management processing in cases in which it has been determined that the an instruction to end the service provided by the selection option information presentation system 100 has been made.

Next, explanation follows regarding the second management processing illustrated in FIG. 17. At step S31, the management section 111 determines whether or not vision information transmitted from the second control device 140 has been received. The determination of the current step is repeated in cases in which vision information has not been received. In cases in which vision information has been received, processing transitions to step S32, and the management section 111 appends a vision ID to the received vision information, and stores the received vision information in the vision DB 119.

Next, at step S33, the management section 111 determines whether or not an instruction to end the service provided by the selection option information presentation system 100 has been made, and processing returns to step S31 in cases in which and instruction to end the service has not been made.

The second management processing ends in cases in which an instruction to end the service has been made.

Next, explanation follows regarding the first control processing illustrated in FIG. 18. The first control processing initiates when the first control device 120 has received the card information and the card display position information transmitted from the management server 110.

At step S41, the display controller 121 controls the first display device 130 such that each of the selection option cards 10 for which card information was received is displayed at the display position indicated by the received card display position information.

Figure 19:
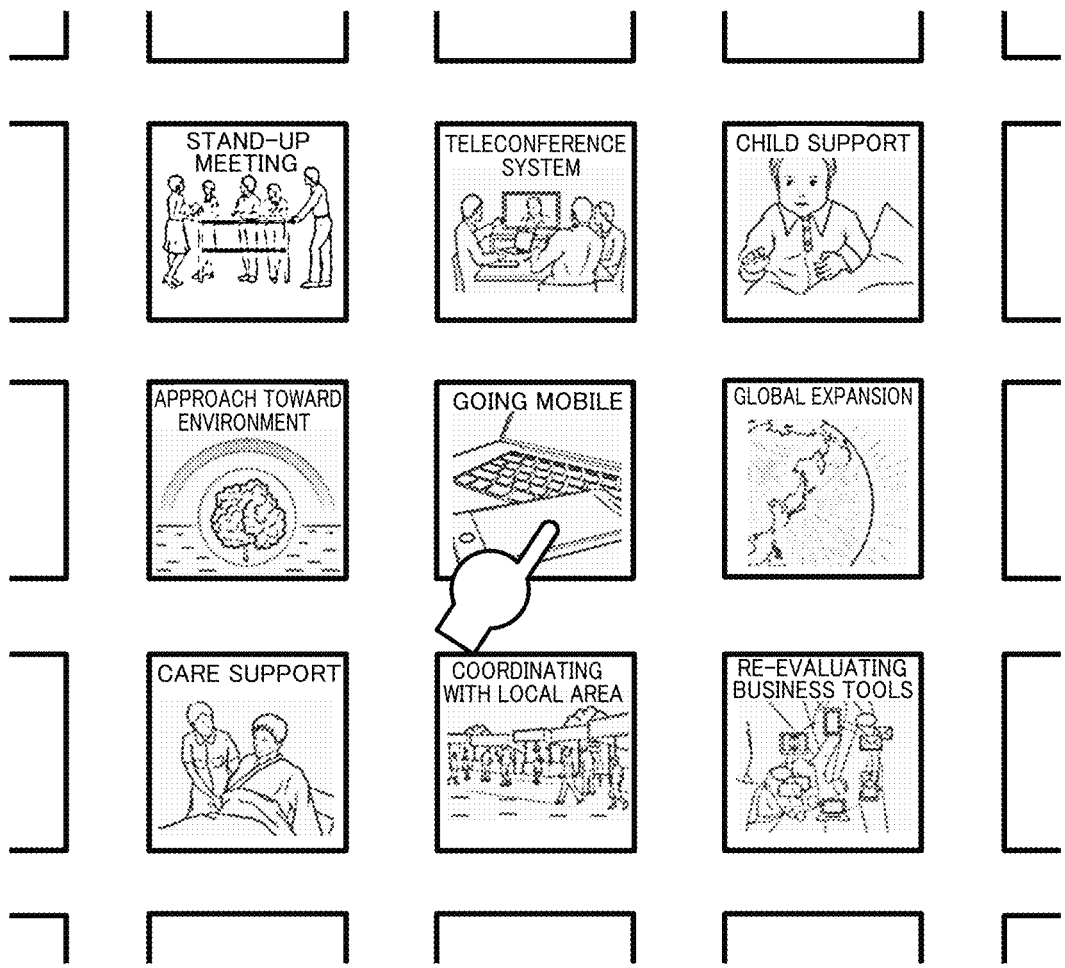
FIG. 19 is a diagram for explaining selection of a selection option card.

Next, at step S42, the detector 122 determines whether or not a selection option card 10 displayed on the first display device 130 has been touched by the user. FIG. 19 illustrates an example of a portion of the display region of the first display device 130 in which the selection option cards 10 are displayed. When it has been detected that any of the selection option cards 10 has been touched by the user as illustrated in FIG. 19, processing transitions to step S43, and the detector 122 transmits the operation information indicating that the touch on the selection option card 10 was detected to the management server 110. The operation information is employed in the first management processing described above in order to determine whether or not the specific duration has passed since a user operation on the selection option cards 10 was last detected.

Figure 20:
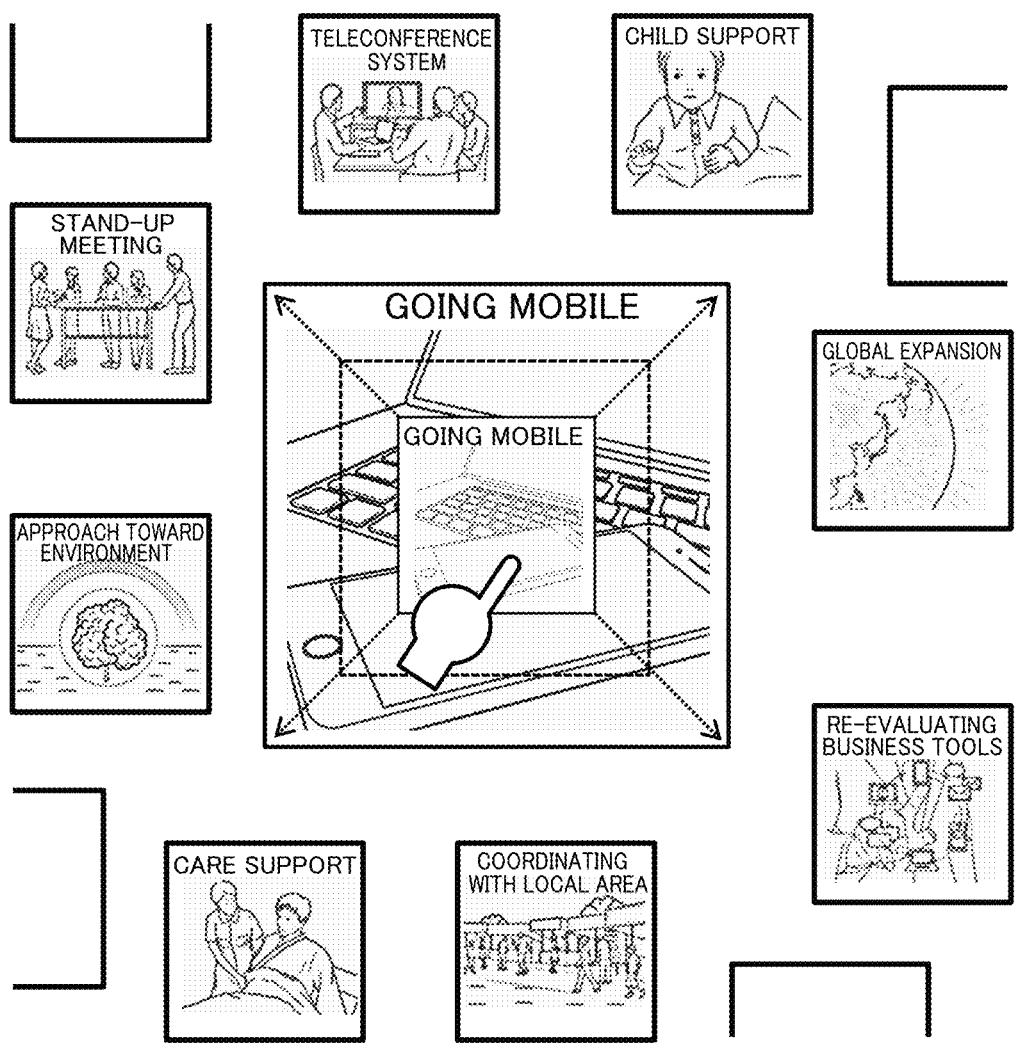
FIG. 20 is a diagram for explaining enlarged display of a selection option card.

Next, at step S44, the detector 122 determines whether or not the touch on the selection option card 10 is continuing. In cases in which the touch is continuing, processing transitions to step S45, and the detector 122 designates the selection option card 10 being touched, and instructs the display controller 121 to perform display enlargement on the designated selection option card 10. The display controller 121 receives the instruction and, as illustrated in FIG. 20, for example, enlarges the display size of the designated selection option card 10. Moreover, together with display enlargement on the designated selection option card 10, the display controller 121 moves the display positions of the selection option cards 10 surrounding the selection option card 10 being displayed enlarged to positions that avoid the selection option card 10 being displayed enlarged.

Next, at step S46, the detector 122 determines whether or not the time for which the touch on the selection option card 10 has continued has exceeded the specific amount of time (for example, three seconds). Processing returns to step S44 in cases in which the time for which the touch has continued has not exceeded the specific amount of time. At step S44, processing transitions to step S47 in cases in which the detector 122 determines that the touch on the selection option card 10 is not continuing. At step S47, the detector 122 instructs the display controller 121 to end display enlargement. The display controller 121 receives the instruction, returns the selection option card 10 being displayed enlarged to its original display size, and returns the display positions of the surrounding selection option cards 10 to their original positions. Processing then returns to step S42.

However, at step S46 above, in cases in which the detector 122 has determined that the time for which the touch on the selection option card 10 has continued has exceeded the specific amount of time, processing transitions to step S48. At step S48, the detector 122 transmits the card ID of the selection option card 10 that was touched to the management server 110 as selection information. In the first management processing described above, the card information corresponding to the selection information is forwarded to the second control device 140 by the forwarding section 112 of the management server 110.

Next, at step S49, the display controller 121 determines whether or not an instruction to end the service provided by the selection option information presentation system 100 has been made, and processing returns to step S42 in cases in which an instruction to end the service has not been made.

At step S42, in cases in which the detector 122 has not detected a touch on a selection option card 10, processing transitions to step S50. At step S50, the display controller 121 determines whether or not card display position information has been received from the management server 110. In cases in which card display position information has been received processing transitions to step S51. At step S51, the display controller 121 modifies the display position of a selection option card 10 being displayed on the first display device 130 based on the received card display position information.

Figure 21:
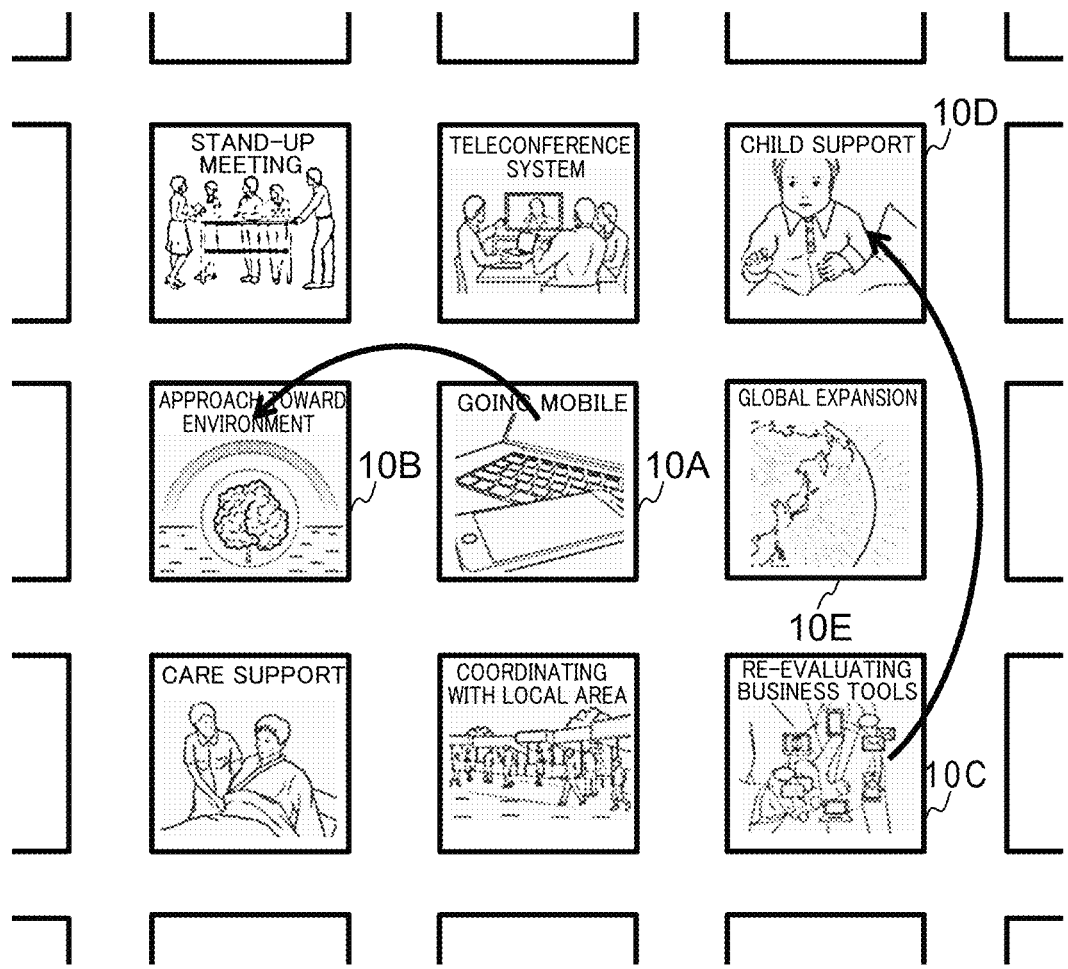
FIG. 21 is a diagram for explaining modification of a display position of a selection option card.
Figure 22:
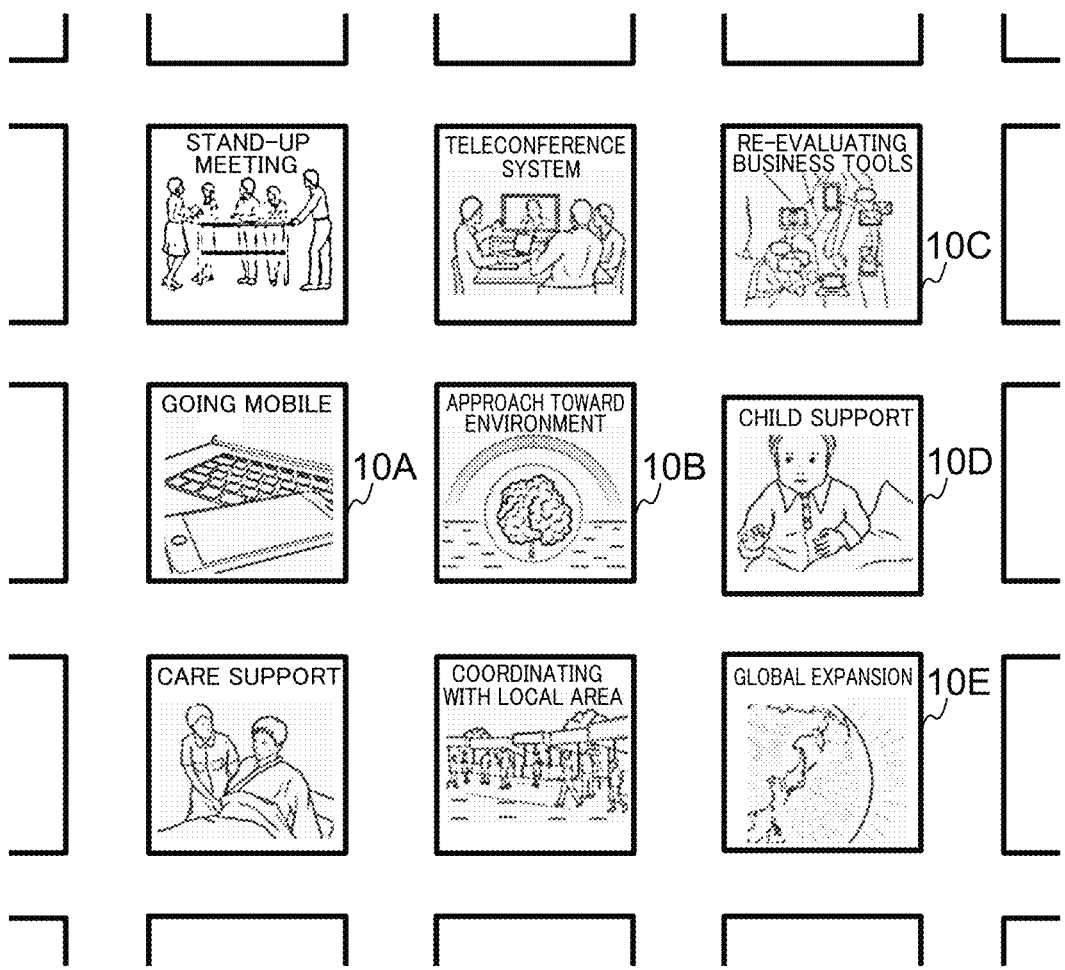
FIG. 22 is a diagram for explaining modification of a display position of a selection option card.

Here, the card display position information received in the first management processing described above is the card display position information that is modified after the specific duration passes since a user operation on the selection option cards 10 was last detected. For example, suppose the card display position information of a selection option card 10A is modified to the display position of a selection option card 10B, and the card display position information of a selection option card 10C is modified to the display position of a selection option card 10D as illustrated in FIG. 21. In this case, the display controller 121, for example, as illustrated in FIG. 22, modifies the display such that the selection option card 10A and the selection option card 10B are swapped. Moreover, the display controller 121 moves the selection option card 10C to the position of the selection option card 10D, and moves the selection option card 10D and a selection option card 10E down by one.

Processing returns to step S42 when modification of the display position of the selection option card 10 based on the received card display position information has ended.

At step S49 above, the first control processing ends in cases in which the display controller 121 has determined that an instruction to end the service provided by the selection option information presentation system 100 has been made.

Next, explanation follows regarding the second control processing illustrated in FIG. 23. The second control processing initiates when the background information transmitted by the management server 110 has been received by the second control device 140.

At step S61, the display controller 141 displays the background 12 indicated by the received background information on the second display device 150. The displayed background 12 may be modifiable by user instruction. For example, in cases in which an instruction to modify the background 12 has been made, the second control device 140 requests the background information to the management server 110. The management server 110 then transmits the background information that differs from the background information previously transmitted from the background DB 118 to the second control device 140.

Next, at step S62, the display controller 141 determines whether or not card information has been received from the management server 110. Processing transitions to step S63 in cases in which card information has been received. Here, the card information to be received is the card information of the selection option card 10 that, in the first management processing described above, was selected on the first display device 130, and which was forwarded by the management server 110. At step S63, the display controller 141 displays the selection option card 10 indicated by the received card information on the background 12, and processing transitions to step S64. However, in cases in which card information has not been received, the processing of step S63 is skipped, and processing transitions to step S64.

At step S64, the receiver 142 determines whether or not a user operation such as modification of the display position or a modification of the display size of the selection option card 10 displayed on the second display device 150, input of text data, or drawing using the handwriting tool, has been received. Processing transitions to step S65 in cases in which an operation has been received. At step S65, the receiver 142 notifies the display controller 141 with the received information indicating the contents of the received user operation. Then, the display controller 141 modifies the display position and display size of the selection option card 10, displays the inputted text data, displays the drawn image, or the like, based on the received information, and processing transitions to step S66. However, in cases in which a user operation has not been received, the processing of step S65 is skipped, and processing transitions to step S66.

Next, at step S66, the generation section 143 determines whether or not an instruction to finalize a vision has been made by the user. Processing transitions to step S67 in cases in which an instruction to finalize a vision has been made. At step S67, the generation section 143 acquires the display position of each of the selection option cards 10 on the background 12 displayed on the second display device 150. The generation section 143 then generates vision information including the background ID of the background 12 displayed on the second display device 150, the card IDs of the selection option cards 10, the acquired display position of each of the selection option cards 10, the inputted text data, and the drawn handwritten data. Moreover, the generation section 143 acquires the user ID of the user who generated the vision from the login information, the registration information employed when the system was used, or the like, appends the user ID to the generated vision information, and transmits the generated vision information to the management server 110, and processing then transitions to step S68. However, in cases in which the instruction to finalize a vision has not been made, the processing of step S67 is skipped, and processing transitions to step S68.

At step S68, the receiver 142 determines whether or not an instruction to end a service provided by the selection option information presentation system 100 has been made. Processing returns to step S62 in cases in which an instruction to end the service has not been made; otherwise, the second control processing ends in cases in which an instruction to end the service has been made.

Figure 24:
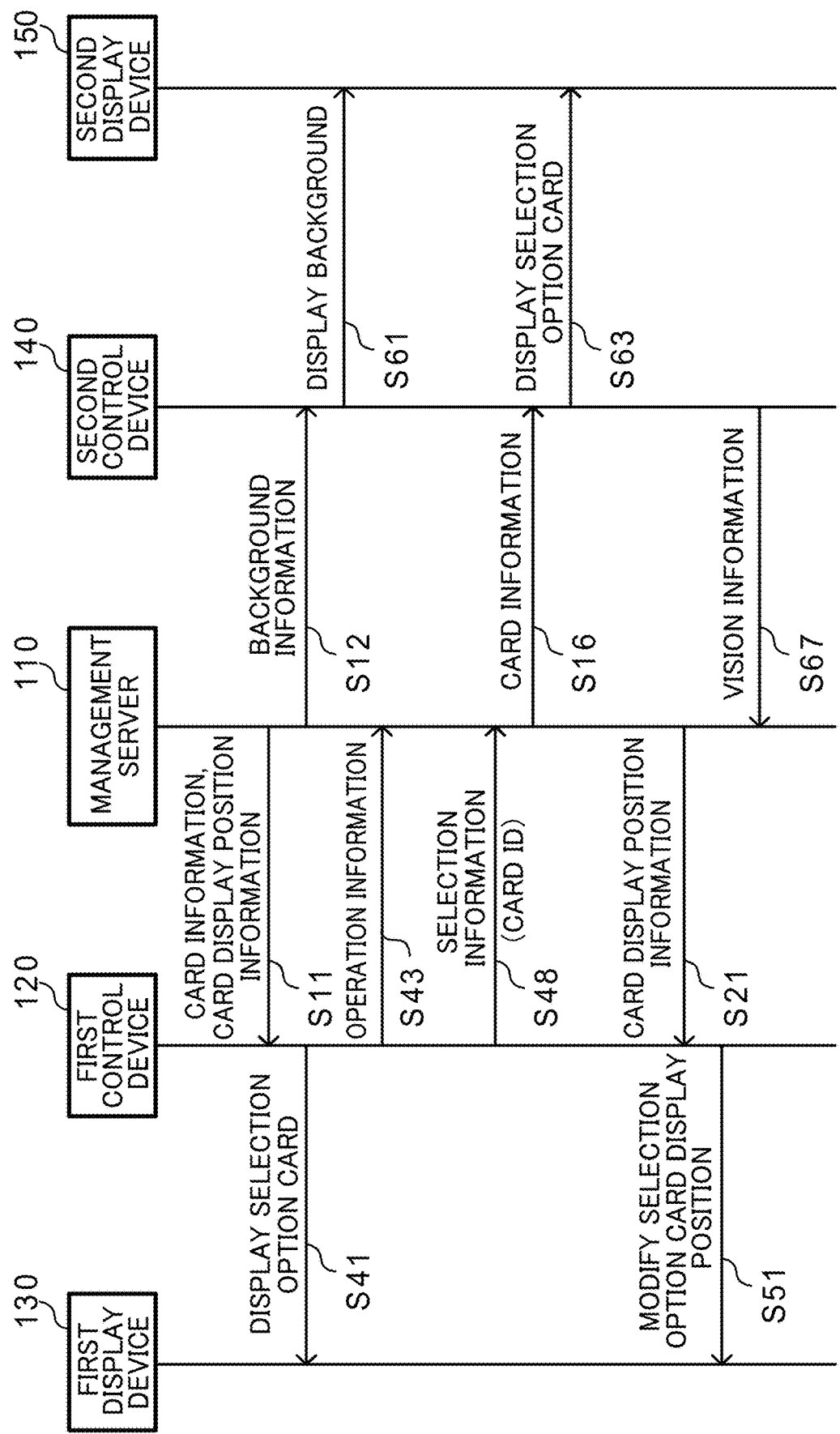
FIG. 24 is a sequence chart illustrating exchange of information between devices.

Next, explanation follows regarding exchange of information between each of the devices, with reference to the sequence chart of FIG. 24. In each type of processing included in the sequence chart of FIG. 24, the same reference numerals are allocated to processing similar to that of the first management processing illustrated in FIG. 16, the second management processing illustrated in FIG. 17, the first control processing illustrated in FIG. 18, and the second control processing illustrated in FIG. 23.

First, when an instruction to initiate the service provided by the selection option information presentation system 100 has been made, the management server 110 transmits the card information and the card display position information of the selection option card 10 to the first control device 120 (S11). Then, the first control device 120 displays the selection option cards 10 on the first display device 130 based on the card information and the card display position information (S41). Moreover, the management server 110 transmits the background information to the second control device 140 (S12). The second control device 140 then displays the background 12 on the second display device 150 based on the background information (S61).

Each time an operation by the user is performed on a selection option card 10 displayed on the first display device 130, the first control device 120 transmits the operation information to the management server 110 (S43). Moreover, in cases in which any of the selection option cards 10 has been selected by the user, the first control device 120 transmits the selection information including the card ID of the selected selection option card 10 to the management server 110 (S48).

When the management server 110 has received the selection information, the management server 110 forwards the card information corresponding to the card ID indicated by that selection information to the second control device 140 (S16). The second control device 140 then displays the selection option card 10 on the second display device 150 based on the card information (S63).

Moreover, the management server 110 modifies the card display position information based on the reception state of the operation information, and transmits the modified card display position information to the first control device 120 (S21). The first control device 120 modifies the display position of the selection option card 10 being displayed on the first display device 130 based on the card display position information (S51).

When an instruction to finalize a vision in the second display device 150 has been made by the user, the second control device 140 generates vision information based on the background 12 and the selection option cards 10 displayed on the second display device 150, and transmits the generated vision information to the management server 110 (S67). The vision generated by the user can be printed out using the printer 170.

As explained above, in the selection option information presentation system 100 according to the first exemplary embodiment, the display positions of the selection option cards 10 displayed on the first display device 130 are modified at a timing at which a specific duration has passed since an operation by the user was last detected. This enables the probability to be increased of a user noticing the existence of a selection option card that they had not noticed the existence of, and can give the user impetus to consider various selection options.

Second Exemplary Embodiment

Next, explanation follows regarding a second exemplary embodiment. In a selection option information presentation system according to the second exemplary embodiment, portions similar to those of the selection option information presentation system 100 according to the first exemplary embodiment are allocated the same reference numerals, and detailed explanation thereof is omitted.

As illustrated in FIG. 1, a selection option information presentation system 200 according to the second exemplary embodiment includes a management server 210, a first control device 220, the first display device 130, the second control device 140, the second display device 150, the scanner 160, and the printer 170.

As illustrated in FIG. 6, the management server 210 includes the management section 111, the forwarding section 112, and the modification section 213 as functional sections. The card DB 116, a card display position DB 217, the background DB 118, and the vision DB 119 are stored in a specific storage region of the management server 210.

Figure 25:
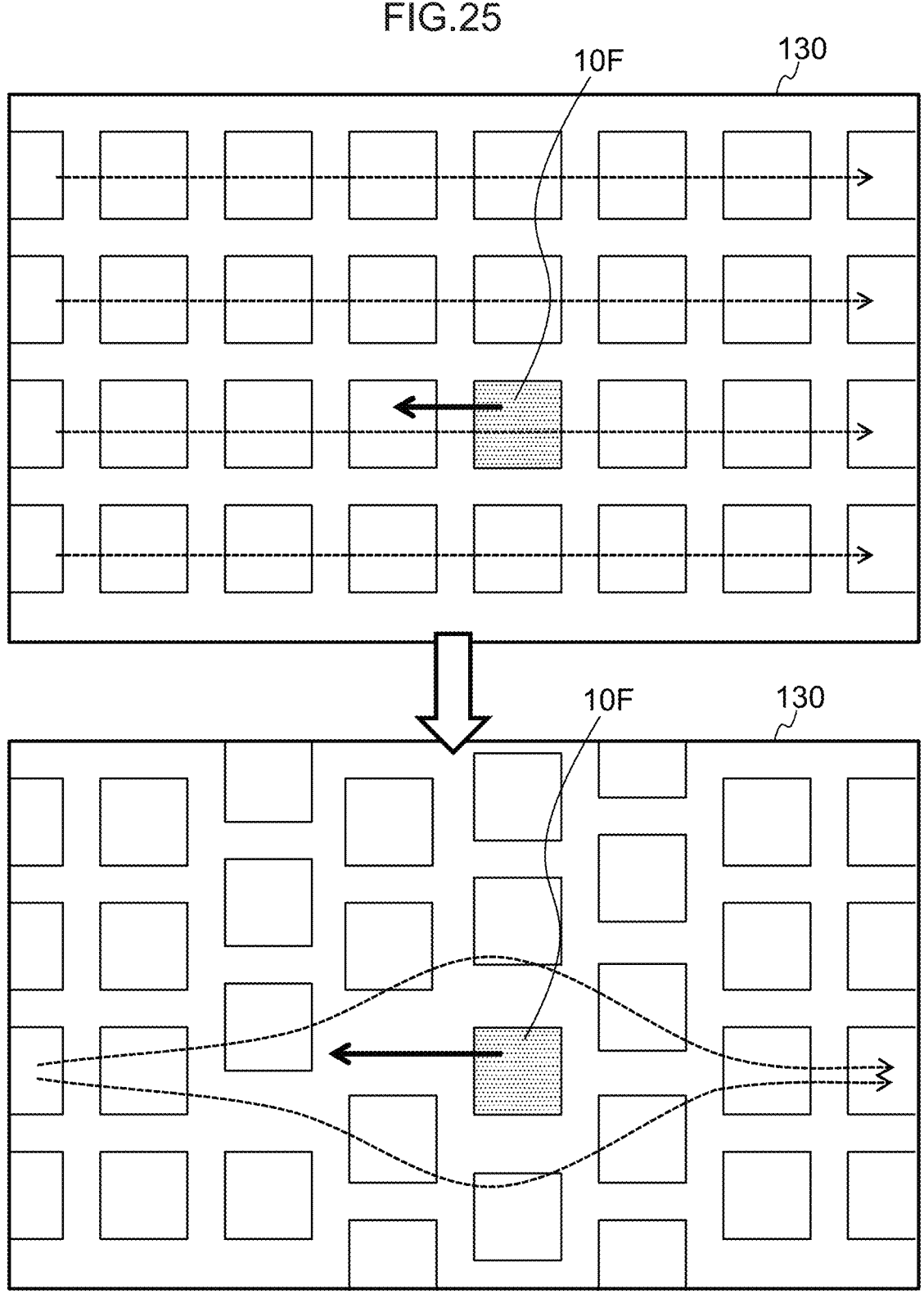
FIG. 25 is a diagram for explaining movement of selection option cards.

Although the display positions of the selection option cards 10 displayed at predetermined positions are modified at the specific timing in the first exemplary embodiment, in the second exemplary embodiment, plural selection option cards 10 are moved, as a whole, in the leftward direction, the rightward direction, the upward direction, or the downward direction (the rightward direction in the example of FIG. 25), as illustrated in the upper part of FIG. 25. Then, at least one of the selection option cards 10 (10F in the example of FIG. 25) is moved in the opposite direction to the movement direction as a whole or in a direction intersecting the movement direction as a whole (the opposite direction in the example of FIG. 25), at the specific timing. Together with this movement, the selection option cards 10 surrounding the selection option card 10F are moved so as to avoid the selection option card 10F, as illustrated in the lower part of FIG. 25.

Information related to movement of each of the selection option cards 10 is stored in the card display position DB 217 for the purpose of implementing the above-described movement of the selection option cards 10. An example of the card display position DB 217 is illustrated in FIG. 26. As the card display position information in the example of FIG. 26, information similar to the display position of the card display position DB 117 of the first exemplary embodiment is stored in association with the "card ID" of each of the selection option cards 10 as an "initial display position". Moreover, "movement information" indicating how each selection option cards 10 is moved is stored in association with the card IDs as card display position information. Movement information may, for example, be information including a movement direction and a movement speed, such as "move in a specific direction (for example, the positive direction of the x-axis) by a specific amount of pixels (for example, one pixel) for each cycle".

Similarly to the modification section 113 of the first exemplary embodiment, a modification section 213 determines whether or not the specific duration has passed since a user operation on the selection option cards 10 was last detected, based on the reception state of operation information. The modification section 213 modifies the movement direction of at least one of the selection option cards 10 at the timing at which the specific duration has passed since a user operation on the selection option cards 10 was last detected. More specifically, the modification section 213, for example, updates the "movement information" of the card display position DB 217 for the at least one selection option card 10, chosen at random. For example, in cases in which the selection option cards 10 are to be moved as a whole one pixel in the positive direction of the x-axis per cycle, the movement direction of the at least one selection option card 10 is modified to the negative direction of the x-axis.

Alternatively, the movement direction of the at least one selection option card 10 may be modified to the positive direction of the y-axis or the negative direction of the y-axis, in contrast to the movement direction of the selection option cards 10 as a whole, this being in the positive direction of the x-axis. Alternatively, the movement direction of the selection option cards 10 as a whole may be set to the positive direction of the y-axis or the negative direction of the y-axis, and the movement direction of the at least one selection option card 10 may be modified either to the opposite direction to the movement direction as a whole, or, to the positive direction of the x-axis or the negative direction of the x-axis. Moreover, not only the movement direction, but also the movement speed may be modified. Modifications to the movement speed include setting the movement speed to "0" after modifying the at least one selection option card 10. In such cases, the at least one selection option card 10 adopts a suspended state while the selection option cards 10 overall flow like a river.

As described above, the display position of the at least one selection option card 10 is modified such that a combination of adjacent selection option cards 10 in the display region forms a combination in which a display position differs in the up-down direction or the left-right direction, by modifying the movement information of the at least one selection option card 10. In cases in which the movement information is modified for plural selection option cards 10, the movement directions and the movement speeds after modification may be different from one another.

As illustrated in FIG. 11, the first control device 220 includes a display controller 221 and a detector 122 as functional sections.

The display controller 221 receives the card information and the card display position information transmitted from the management server 210, and controls the first display device 130 such that each of the selection option cards 10 indicated by the card information is displayed at the display position indicated by the "initial display position" of the card display position information. Moreover, the display controller 221 moves each of the selection option cards 10 based on the "movement information" of the card display position information.

Moreover, in cases in which modified card display position information has been received from the management server 210, the display controller 221 modifies the movement direction or the movement speed, or both, of the at least one selection option card 10 based on the received card display position information. Moreover, together with modifying of the movement direction and movement speed, of the at least one selection option card 10, the display controller 221 moves the surrounding selection option cards 10, so as to avoid the selection option card 10 for which the movement direction or movement speed, or both, was modified. Movement that accompanies avoidance by the surrounding selection option cards 10 may employ conventionally known image placement optimization technology or the like.

Moreover, similarly to the display controller 121 of the first exemplary embodiment, in cases in which enlarged display of a selection option card 10 was instructed from the detector 122, the display controller 221 enlarges the display size of the designated selection option card 10. In such an event, the display controller 221 suspends movement of the selection option card 10 at the touched position, and so as to enlarge display of that selection option card 10 at the position of suspension. Moreover, together with the enlarged display, the display controller 221 moves the surrounding selection option cards 10 so as to avoid the selection option card 10 being displayed enlarged.

The management server 210 may, for example, be implemented by the computer 20 illustrated in FIG. 13. A management program 30A for causing the computer 20 to function as the management server 210 is stored in the storage section 23 of the computer 20. The management program 30A includes the management process 31, the forwarding process 32, and a modification process 33A. The CPU 21 reads the management program 30A from the storage section 23, expands the management program 30A into the memory 22, and sequentially executes the processes included in the management program 30A. The CPU 21 operates as the modification section 213 illustrated in FIG. 6 by executing the modification process 33A. The other processes are similar to those of the management program 30 according to the first exemplary embodiment. The computer 20, which executes the management program 30A, thereby functions as the management server 210.

The first control device 220 may, for example, be implemented by the computer 40 illustrated in FIG. 14. A first control program 50A for causing the computer 40 to function as the first control device 220 is stored in the storage section 43 of the computer 40. The first control program 50A includes a display control process 51A and the detection process 52. The CPU 41 reads the first control program 50A from the storage section 43, expands the first control program 50A into the memory 42, and sequentially executes the processes included in the first control program 50A. The CPU 41 operates as the display controller 221 illustrated in FIG. 1 by executing the display control process 51A. The other processes are similar to those of the first control program 50 according to the first exemplary embodiment. The computer 40, which executes the first control program 50A, thereby functions as the first control device 220.

Similarly to in the first exemplary embodiment, the second control device 140 may, for example, be implemented by the computer 60 illustrated in FIG. 15.

Note that functionality respectively implemented by the management program 30A and the first control program 50A may be implemented by, for example, a semiconductor integrated circuit, and more specifically, by an ASIC or the like.

Explanation follows regarding operations of the selection option information presentation system 200 according to the second exemplary embodiment that differ from the operation of the selection option information presentation system 100 according to the first exemplary embodiment.

At step S20 of the first management processing illustrated in FIG. 16, the modification section 213 of the management server 210 updates the "movement information" of the card display position DB 217 for the at least one selection option card 10.

Moreover, at step S41 of the first control processing illustrated in FIG. 18, the display controller 221 of the first control device 220 controls the first display device 130 such that each of the selection option cards 10 indicated by the card information is displayed at the display position indicated by the "initial display position" of the card display position information. Moreover, the display controller 221 moves each of the selection option cards based on the "movement information" of the card display position information.

Moreover, at step S51, the display controller 221 modifies the movement direction or the movement speed, or both, of the at least one selection option card 10 based on the received card display position information. Moreover, together with modifying the movement direction or the movement speed, or both, of the at least one selection option card 10, the display controller 221 moves the surrounding selection option cards 10 so as to avoid the selection option card 10 for which the movement direction or movement speed, or both, has been modified.

As explained above, in the selection option information presentation system 200 according to the second exemplary embodiment, the movement direction of the at least one selection option card 10 is modified and suspended while moving the selection option cards 10 displayed on the first display device 130 as a whole in the left-right direction or the up-down direction. Similarly to in the first exemplary embodiment, this increases the probability of the user noticing the existence of a selection option card that the user had not noticed the existence of, and can give the user impetus to consider various selection options. Moreover, movement occurring on the screen facilitates drawing the attention of the user.

Note that although explanation has been given in the first and the second exemplary embodiments regarding a case in which at least one selection option card 10 is randomly chosen for modification of the display position or the movement information thereof, there is no limitation thereto. For example, an appearance frequency for each of the selection option cards 10 selected by each user, namely, an appearance frequency for each of the selection option cards 10 stored in association with each user ID, may be tallied with reference to a vision DB 119 like that illustrated in FIG. 10. A selection option card 10 having a high appearance frequency or a selection option card 10 having a low appearance frequency may be chosen as the at least one selection option card 10 for which the display position or the movement information is to be modified. In cases in which the display position or movement information of a selection option card having a high appearance frequency is modified, incidences of selection option cards 10 that receive a high degree of attention going overlooked can be decreased. In cases in which the display position or the movement information of a selection option card having a low appearance frequency is modified, impetus can also be given to pay attention to selection option cards 10 that are easily overlooked.

Moreover, a predetermined selection option card 10 may be chosen as the at least one selection option card 10 for which the display position or the movement information is to be modified according to attributes of the user that generated the vision. In cases in which the user is an enterprise, examples of user attributes include industry, number of employees, and number of offices, and in cases in which the user is an individual, examples of user attributes include sex, age, and area of residence. The user can thereby be made to notice the existence of selection option cards 10 suited to the user that the user is not conscious of.

Moreover, the provider side of the service may freely choose at least one selection option card 10 for which the display position is to be modified. In such cases, a flag may be set for the card display position information corresponding to the freely determined selection option card 10 in the card display position DB 117. This increases the probability that the user will pay attention to the existence of the selection option card 10 reflecting the intention of the service provider side.

Moreover, in the case of the second exemplary embodiment, a selection option card 10 having arrived at a specific position, from out of the selection option cards 10 being moved as a whole in the left-right direction or the up-down direction, may be chosen as the at least one selection option card 10 for which the display position or the movement information is to be modified.

Third Exemplary Embodiment

Next, explanation follows regarding a third exemplary embodiment. In the selection option information presentation system according to the third exemplary embodiment, portions similar to those of the selection option information presentation system 100 according to the first exemplary embodiment are allocated the same reference numerals, and detailed explanation thereof is omitted.

As illustrated in FIG. 1, a selection option information presentation system 300 according to the third exemplary embodiment includes a management server 310, a first control device 120, the first display device 130, the second control device 140, the second display device 150, the scanner 160, and the printer 170.

As illustrated in FIG. 6, the management server 310 includes the management section 111, the forwarding section 112, and a modification section 313 as functional sections. Moreover, a card DB 316, the card display position DB 117, the background DB 118, and the vision DB 119 are stored in a specific storage region of the management server 310.

In the third exemplary embodiment, display positions are modified for each category of the selection option cards 10 based on the attributes for each category of the selection option cards 10. Plural categories, such a category representing types of device, and a category representing work methods, may be employed as the categories. Attributes of categories representing types of devices may, for example, be set to tablets, smartphones, or internet of things (IoT). Attributes of categories representing work method may, for example, be set to office, factory, R&D, home, or the like.

In addition to each item of card information stored in the card DB 116 of the first exemplary embodiment, attributes respectively related to the plural categories respectively appended to each of the selection option cards 10 are also stored in the card DB 316. FIG. 27 illustrates an example of the card DB 316. In the example of FIG. 27, "category A", "category B", . . . are provided as "categories", and the attributes for each category are associated with each item of card information of the respective selection option cards 10.

Similarly to the modification section 113 of the first exemplary embodiment, the modification section 313 determines whether or not the specific duration has passed since a user operation on the selection option cards 10 was last detected, based on the reception state of the operation information. The modification section 313 chooses a category from the plural categories at the timing at which the specific duration has passed since a user operation on the selection option cards 10 was last detected. The modification section 313 then modifies the "display position" for each of the selection option cards 10 in the card display position DB 117 such that selection option cards 10 appended with the same attributes for a chosen category are displayed along the up-down direction or the left-right direction.

Figure 28:
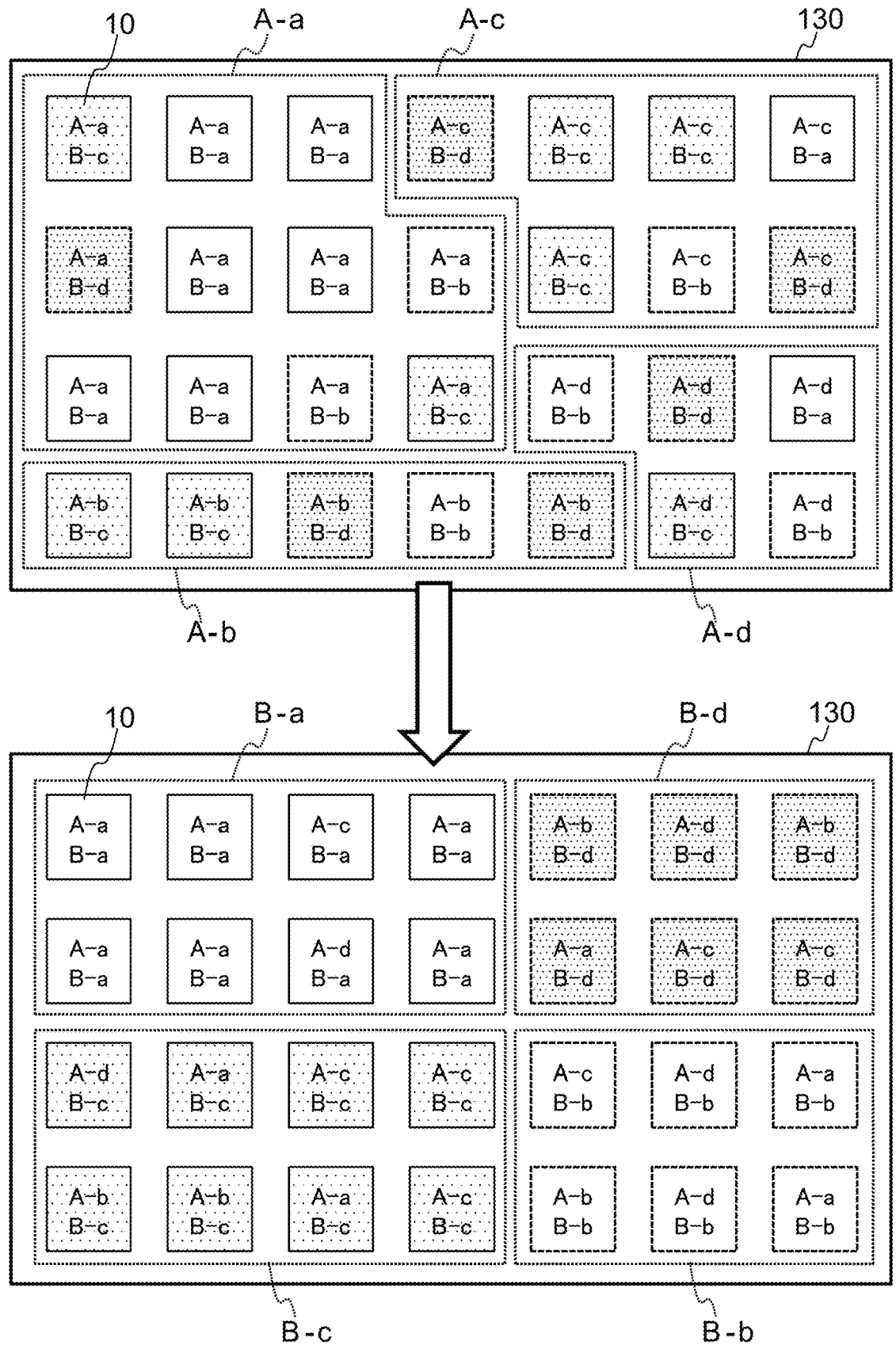
FIG. 28 is a diagram for explaining modification of display positions of selection option cards employing attributes of categories.

In the display controller 121 of the first control device 120, the display positions of the selection option cards 10 are modified based on the card display position information that was modified according to a category like those described above. For example, suppose selection option cards 10 appended with the same attributes related to the category A are displayed adjacent to each other in the up-down direction or the left-right direction as illustrated in the upper part of FIG. 28. Namely, suppose the selection option cards 10 are grouped by their attributes in the category A. Note that the display inside the selection option cards 10 in FIG. 28 represents the attributes for each category appended to that selection option card 10. For example, the notation "A-a B-c" indicates that an attribute a is appended to the selection option card 10 for category A, and an attribute c is appended to the selection option card 10 for category B. Moreover, for the sake of explaining processing of a later stage, line types and shading of the selection option cards 10 in FIG. 28 differ according to differences in attributes related to category B.

In this state, at a specific timing, when the modification section 313 has chosen to use the attributes in the category B to modify display positions, the selection option cards 10 are modified to grouped display positions by their attributes in the category B, as illustrated in the lower part of FIG. 28. Thus, by modifying which category is chosen, the display position of at least one selection option card 10 is modified such that a combination of adjacent selection option cards 10 inside the display region form a combination in which a display position differs in the up-down direction or the left-right direction. For example, each of the selection option cards 10 is modified, from a grouped display position based on their attributes related to the category representing type of device, to a grouped display position based on their attributes related to the category indicating the work method.

The management server 310 may, for example, be implemented by the computer illustrated in FIG. 13. A management program 30B for causing the computer 20 to function as the management server 310 is stored in the storage section 23 of the computer 20. The management program 30B includes the management process 31, the forwarding process 32, and a modification process 33B. The CPU 21 reads the management program 30B from the storage section 23, expands the storage section 23 into the memory 22, and sequentially executes the processes included in the management program 30B. The CPU 21 operates as the modification section 313 illustrated in FIG. 6 by executing the modification process 33B. The other processes are similar to those of the management program 30 according to the first exemplary embodiment. The computer 20, which executes the management program 30B, functions as the management server 310.

Similarly to in the first exemplary embodiment, the first control device 120 may, for example, be implemented by the computer 40 illustrated in FIG. 14. Moreover, similarly to in the first exemplary embodiment, the second control device 140 may, for example, be implemented by the computer 60 illustrated in FIG. 15.

The functionality implemented by the management program 30B may be implemented by, for example, a semiconductor integrated circuit, and more specifically, by an ASIC or the like.

Explanation follows regarding operations of the selection option information presentation system 300 according to the third exemplary embodiment that differ from the operation of the selection option information presentation system 100 according to the first exemplary embodiment.

At step S20 of the first management processing illustrated in FIG. 16, the modification section 313 of the management server 310 chooses a category from the plural categories. The modification section 313 then modifies the "display position" for each of the selection option cards 10 in the card display position DB 117 such that the selection option cards 10 appended with the same attributes related to the chosen category are displayed adjacent to each other in the up-down direction or the left-right direction.

As explained above, in the selection option information presentation system 300 according to the third exemplary embodiment, attributes respectively related to plural categories are respectively appended to the selection option cards 10. Then, selection option cards 10 appended with the same attributes related to a given category are displayed grouped together. Next, selection option cards 10 appended with the same attributes related to a different category are modified so as to be displayed grouped together. Thus, modifying groupings of the selection option cards 10 using a different viewpoint at each occasion of the specific timing in this manner can increase the probability of a user noticing the existence of a selection option card that they had not noticed the existence of, and can give the user impetus to consider various selection options.

Although explanation has been given in each of the exemplary embodiments above regarding cases in which the display position or the movement information of at least one selection option card 10 is modified at the timing at which the specific duration has passed since a user operation on the selection option cards 10 was last detected, there is no limitation to. It is sufficient for the timing at which the display position or the movement information is modified to be a specific timing in a duration in which no user operations on the selection option cards 10 are detected. For example, modifications may be made at periodic timings (for example, every 30 seconds) in a duration in which no user operations on the selection option cards 10 are detected, or modifications may be made at random timings in that duration.

Moreover, plural of the second display device may be provided in each of the exemplary embodiments above. In such cases, a different background is displayed on each second display device. Then, when a selection option card selected from the first display device is forwarded to the second display device, forwarding is performed after selection of which second display device to forward to. This, for example, enables different visions to be displayed on different second display devices, such as a vision of the current state of affairs and a vision of future hopes.

Moreover, in each of the exemplary embodiments above, plural of the first display device may be provided, and the plural first display devices may be coordinated to function as a single large display. In such cases, a greater amount of selection option cards can be displayed.

In each of the exemplary embodiments above, handwritten notes and the like may be read by the scanner 160, may be expressed in an electronic card format similar to that of the selection option cards 10, and may be displayed on the second display device 150. This enables information not included in the selection options expressed by the selection option cards 10 to be reflected in the vision.

Although explanation has been given in each of the exemplary embodiments above regarding cases in which the first control device 120 controls display on the first display device 130, and the second control device 140 controls display on the second display device 150, there is no limitation to. For example, the management server 110 may control display on the first display device 130 and the second display device 150. In such cases, each functional section of the first control device 120 and each functional section of the second control device 140 may be provided by the management server 110.

Although explanation has been given in each of the exemplary embodiments above regarding modes in which the management program 30, 30A, 30B, the first control program 50, 50A, and the second control program 70 are pre-stored (installed) in the storage section 23, 43, 63, there is no limitation to. The program according to technology disclosed herein may be provided by a mode recorded to a recording medium such as a CD-ROM, a DVD-ROM, or USB memory.

When user desires are extracted and products and services are provided according to their desires, only products and services that partially satisfy user desires can be provided in cases in which only fragmentary user desires are extracted. It is therefore important to extract a full account of desires, such as future visions and concepts drawn up by users using free imagination, without being swayed by products and services being provided. However, operations that strictly extract such visions and concepts involve consulting, which entails time and cost.

In order to address this, various selection options that are useful to extract user desires are presented to the user by displaying a keyword, an illustration, or the like, and the user chooses a selection option having contents that match their desire. A conceivable method is one in which the provider of the product or service takes selection options chosen by users as material to consider in order to infer user desires, and provides a product or service conforming to user desires. In this method, various selection options need to be presented to users appropriately to enable user desires to be sufficiently reflected.

An aspect of technology disclosed herein enables plural selection options to be presented such that a user can notice the existence of various selection options.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A selection option information presentation system that includes a first display device, a second display device, and a control device, the control device comprising:
    a processor configured to execute a process, the process including:
        statically displaying all of a plurality of items of selection option information on the first display device in states in which a selection operation can be received;
        in a case in which a specific duration in which no selection operation is detected has passed, determining at least one or more items of selection option information from the displayed plurality of items of selection option information, and moving a display position of the determined at least one or more items of selection option information such that a combination of adjacent items of selection option information within a display region is changed to a different combination in an up-down direction or a left-right direction, or both,
        repeating the static displaying and the moving of the display position until a selection operation of any of the plurality of items of selection option information has been received, and
        when a selection operation of any of the plurality of items of selection option information displayed on the first display device has been received, displaying the selection option information that received the selection operation on the second display device,
        wherein, in the process, the at least one or more items of selection option information that has been determined to be moved is chosen based on a frequency for each of the items of selection option information of receiving selection operations while being displayed on the first display device previously.

2. The selection option information presentation system of claim 1, wherein, in the process, at the specific timing, while the plurality of items of selection option information are respectively being moved in the up-down direction or the left-right direction in the display region, the at least one or more items of selection option information is moved in a direction opposite to, or in a direction intersecting, the direction being moved in.

3. The selection option information presentation system of claim 2, wherein, in the process, from out of the plurality of items of selection option information, selection option information for which the display position has become a specific position is set as the at least one or more items of selection option information.

4. The selection option information presentation system of claim 1, wherein, in the process, at the specific timing, while the plurality of items of selection option information are respectively being moved in the up-down direction or the left-right direction in the display region, movement of the at least one or more items of selection option information in the up-down direction or the left-right direction is suspended.

5. The selection option information presentation system of claim 1, wherein, in the process:
    attributes related to a plurality of respective categories are appended to the selection option information; and
    at each occasion of the specific timing, the display position of the at least one or more items of selection option information is modified such that items of selection option information appended with the same attributes related to a category chosen from the plurality of categories are displayed adjacent in the up-down direction or the left-right direction.

6. The selection option information presentation system of claim 1, wherein, in the process, the specific timing is selected from the group consisting of a timing at which a specific amount of time has passed since a selection operation was last detected, a periodic timing in the duration in which no selection operation is detected, and a random timing in the duration in which no selection operation is detected.

7. The selection option information presentation system of claim 1, wherein, in the process, when the display position of the selection option information is modified, an animation of a card moving from an original display position to a new display position is displayed.

8. A selection option information presentation method wherein, in a selection option information presentation system including a first display device, a second display device, and a control device, the control device:
    statically displaying all of a plurality of items of selection option information on the first display device in states in which a selection operation can be received;
    in a case in which a specific duration in which no selection operation is detected has passed, determining at least one or more items of selection option information from the displayed plurality of items of selection option information, and moving a display position of the determined at least one or more items of selection option information such that a combination of adjacent items of selection option information within a display region is changed to a different combination in an up-down direction or a left-right direction, or both,
    repeating the static displaying and the moving of the display position until a selection operation of any of the plurality of items of selection option information has been received, and
    when a selection operation of any of the plurality of items of selection option information displayed on the first display device has been received, displaying the selection option information that received the selection operation on the second display device, wherein the at least one or more items of selection option information that has been determined to be moved is chosen based on a frequency for each of the items of selection option information of receiving selection operations while being displayed on the first display device previously.

9. The selection option information presentation method of claim 8, wherein, at the specific timing, while the plurality of items of selection option information are respectively being moved in the up-down direction or the left-right direction in the display region, the at least one or more items of selection option information is moved in a direction opposite to, or in a direction intersecting, the direction being moved in.

10. The selection option information presentation method of claim 9, wherein, from out of the plurality of items of selection option information, selection option information for which the display position has become a specific position is set as the at least one or more items of selection option information.

11. The selection option information presentation method of claim 8, wherein, at the specific timing, while the plurality of items of selection option information are respectively being moved in the up-down direction or the left-right direction in the display region, movement of the at least one or more items of selection option information in the up-down direction or the left-right direction is suspended.

12. The selection option information presentation method of claim 8, wherein:
attributes related to a plurality of respective categories are appended to the selection option information; and
at each occasion of the specific timing, the display position of the at least one or more items of selection option information is modified such that items of selection option information appended with the same attributes related to a category chosen from the plurality of categories are displayed adjacent in the up-down direction or the left-right direction.

13. The selection option information presentation method of claim 8, wherein, the specific timing is selected from the group consisting of a timing at which a specific amount of time has passed since a selection operation was last detected, a periodic timing in the duration in which no selection operation is detected, and a random timing in the duration in which no selection operation is detected.

14. The selection option information presentation method of claim 8, wherein, when the display position of the selection option information is modified, an animation of a card moving from an original display position to a new display position is displayed.

15. A non-transitory recording medium storing a selection option information presentation program that causes a control device to execute a process in a selection option information presentation system including a first display device, a second display device, and the control device, the process comprising:
statically displaying all of a plurality of items of selection option information on the first display device in states in which a selection operation can be received;
in a case in which a specific duration in which no selection operation is detected has passed, determining at least one or more items of selection option information from the displayed plurality of items of selection option information, and moving a display position of the determined at least one or more items of selection option information such that a combination of adjacent items of selection option information within a display region is changed to a different combination in an up-down direction or a left-right direction, or both,
repeating the static displaying and the moving of the display position until a selection operation of any of the plurality of items of selection option information has been received, and
when a selection operation of any of the plurality of items of selection option information displayed on the first display device has been received, displaying the selection option information that received the selection operation on the second display device,
wherein the at least one or more items of selection option information that has been determined to be moved is chosen based on a frequency for each of the items of selection option information of receiving selection operations while being displayed on the first display device previously.

16. The non-transitory recording medium of claim 15, wherein, in the process, at the specific timing, while the plurality of items of selection option information are respectively being moved in the up-down direction or the left-right direction in the display region, the at least one or more items of selection option information is moved in a direction opposite to, or in a direction intersecting, the direction being moved in.

17. The non-transitory recording medium of claim 16, wherein, in the process, from out of the plurality of items of selection option information, selection option information for which the display position has become a specific position is set as the at least one or more items of selection option information.

18. The non-transitory recording medium of claim 15, wherein, in the process, at the specific timing, while the plurality of items of selection option information are respectively being moved in the up-down direction or the left-right direction in the display region, movement of the at least one or more items of selection option information in the up-down direction or the left-right direction is suspended.

* * * * *